(12) United States Patent
Laroche et al.

(10) Patent No.: US 10,491,907 B2
(45) Date of Patent: Nov. 26, 2019

(54) ENCODING PROCESS USING A PALETTE MODE

(71) Applicant: CANON KABUSHIKI KAISHA, Tokyo (JP)

(72) Inventors: Guillaume Laroche, La Basse Romerais (FR); Christophe Gisquet, Rue du Martin Pêcheur (FR); Patrice Onno, Allée Georges Palante (FR)

(73) Assignee: Canon Kabushiki Kaisha, Tokyo (JP)

( * ) Notice: Subject to any disclaimer, the term of this patent is extended or adjusted under 35 U.S.C. 154(b) by 17 days.

(21) Appl. No.: 15/516,661

(22) PCT Filed: Oct. 6, 2015

(86) PCT No.: PCT/EP2015/073062
§ 371 (c)(1),
(2) Date: Apr. 3, 2017

(87) PCT Pub. No.: WO2016/055486
PCT Pub. Date: Apr. 14, 2016

(65) Prior Publication Data
US 2017/0310977 A1    Oct. 26, 2017

(30) Foreign Application Priority Data
Oct. 6, 2014  (GB) .................................. 1417652.3

(51) Int. Cl.
*H04N 19/176* (2014.01)
*H04N 19/70* (2014.01)
(Continued)

(52) U.S. Cl.
CPC ......... *H04N 19/176* (2014.11); *H04N 19/103* (2014.11); *H04N 19/139* (2014.11);
(Continued)

(58) Field of Classification Search
USPC .................................................... 375/240.02
See application file for complete search history.

(56) References Cited

U.S. PATENT DOCUMENTS

2007/0036223 A1  2/2007 Srinivasan
2014/0009576 A1  1/2014 Hadzic et al.
(Continued)

FOREIGN PATENT DOCUMENTS

CN    101243611 B    12/2012
CN    103281538 A    9/2013
(Continued)

OTHER PUBLICATIONS

Zhu, et al., "Non-SCCE3: Modified copy above mode for palette based coding", 18. JCT-VC Meeting,Jun. 30, 2014-Jul. 9, 2014, Sapporo; (Joint Collaborative Team on Video Coding of ISO/I EC JTC1/SC29/WG11 and ITU-T SG.16 ), URL:http://wftp3.itu.int/av-arch/jctvc-site/, No. JCTVC-R0078-v2, Jul. 2, 2014, XP030116327, paragraph [02 .1].
(Continued)

*Primary Examiner* — Behrooz M Senfi
(74) *Attorney, Agent, or Firm* — Canon U.S.A., Inc. IP Division

(57) ABSTRACT

The present invention is related to video coding and decoding, in particular HEVC SCC that define a palette coding mode. In conventional palette modes, the block of levels built from the Coding Unit and from the palette is encoded using syntax elements, such as the "Pred mode" element, the optional "Level" element and the "Run" element defining the number of successive indexes of the block of indexes that are concerned by an operation defined by the "Pred mode" element and the optional "Level" element. In improved embodiments of the invention, the last "Run" element for the Coding Unit uses a particular up-to-end codeword, instead of a codeword associated with a defined
(Continued)

number of successive indexes, in order to indicate to perform the operation for the indexes at all remaining block positions up to the end of the block of indexes, regardless the number of the remaining block positions, are concerned.

8 Claims, 21 Drawing Sheets

(51) Int. Cl.
- *H04N 19/593* (2014.01)
- *H04N 19/93* (2014.01)
- *H04N 19/103* (2014.01)
- *H04N 19/139* (2014.01)
- *H04N 19/186* (2014.01)

(52) U.S. Cl.
CPC ......... *H04N 19/186* (2014.11); *H04N 19/593* (2014.11); *H04N 19/70* (2014.11); *H04N 19/93* (2014.11)

(56) References Cited

U.S. PATENT DOCUMENTS

| | | | |
|---|---|---|---|
| 2014/0064612 A1 | 3/2014 | Matsumura | |
| 2015/0016501 A1* | 1/2015 | Guo | G06T 9/00 375/240.02 |
| 2015/0181223 A1* | 6/2015 | Gisquet | H04N 19/593 375/240.12 |
| 2015/0264365 A1* | 9/2015 | Tsai | H04N 19/593 375/240.03 |
| 2016/0007042 A1* | 1/2016 | Pu | H04N 19/176 375/240.13 |
| 2016/0094851 A1* | 3/2016 | Pu | H04N 19/91 375/240.24 |
| 2016/0316214 A1* | 10/2016 | Gisquet | G09G 5/06 |
| 2017/0289566 A1* | 10/2017 | He | H04N 19/52 |

FOREIGN PATENT DOCUMENTS

| | | |
|---|---|---|
| CN | 103703779 A | 4/2014 |
| RU | 2420021 C2 | 5/2011 |
| WO | 2015/006169 A | 1/2015 |

OTHER PUBLICATIONS

Chang, et al., Non-SCCE3: Run-copy coding method for two-color index map of palette CU, 18. JCT-VC Meeting, Jun. 30, 2014-Jul. 9, 2014, Sapporo; (Joint Collaborative Team on Video Coding of ISO/IEC JTC1/SC29/WG11 and ITU-T SG.16 ), URL:http://wftp3.itu.int/av-arch/jctvc-site/, No. JCTVC-R0076-v3, Jul. 2, 2014 XP030116324, paragraphs [0001], [0002].

Huang, et al., "SCCE3: Summary report of CE on palette mode", 18. JCT-VC Meeting, Jun. 30, 2014-Jul. 9, 2014, Sapporo; (Joint Collaborative Team on Video Coding of ISO/IEC JTC1/SC29/WG11 and ITU-T SG.16 ), URL:http://wftp3.itu.int/av-arch/jctvc-site/, No. JCTVC-R0033-v2, Jul. 1, 2014, XP030116274, paragraph [3.3.1].

Pu, et al., "SCCE3: Test B.12-Binarization of Escape Sample and Palette Index", 18. JCT-VC Meeting, Jun. 30, 2014-Jul. 9, 2014, Sapporo; (Joint Collaborative Team on Video Coding of ISO/IEC JTC1/SC29/WG11 and ITU-T SG.16 ), URL:http://wftp3.itu.int/av-arch/jctvc-site/, No. JCTVC-R0065, Jun. 21, 2014, XP030116309, paragraph [1.1.3].

Joshi, et al., "High Efficiency Video Coding (HEVC) Screen Content Coding Draft 1", 18. JCT-VC Meeting, Jun. 30, 2014-Jul. 9, 2014, Sapporo; (Joint Collaborative Team on Video Coding of ISO/IEC JTC1/SC29/WG11 and ITU-T SG.16 ), URL:http://wftp3.itu.int/av-arch/jctvc-site/, No. JCTVC-R1005-v2, Aug. 23, 2014, XP030116694, paragraph [9.3.3.13].

Laroche, et al.,"Non-CE6: Last run flag for Palette mode", 19. JCT-VC Meeting, Oct. 17, 2014-Oct. 24, 2014, Strasbourg; (Joint Collaborative Team on Video Coding of ISO/IEC JTC1/SC29/WG11 and ITU-T SG.16 ), URL:http://wftp3.itu.int/av-arch/jctvc-site/, No. JCTVC-S0064, Oct. 7, 2014, XP030116801, the whole document.

Joshi, et al., High Efficiency Video Coding (HEVC) Screen Content Coding: Draft 1, Joint Collaborative Team on Video Coding (JCT-VC) of ITU-T SG 16 WP 3 and ISO/IEC JTC 1/SC 29/WG 11, 18th Meeting, No. JCTVC-R1005-v3, Jun. 30-Jul. 9, 2014.

Zhu, et al., Non-SCCE3: Modified Copy Above Mode for Palette Based Coding, Joint Collaborative Team on Video Coding (JCT-VC) of ITU-T SG 16 WP 3 and ISO/IEC JTC 1/SC 29/WG 11, 18th Meeting: Sapporo, Japan, Jun. 30-Jul. 9, 2014, JCTVC-R0078 (Saved Jun. 21, 2014).

Chang, et al., Non-SCCE3: Run-copy Coding Method for Two-Color Index Map of Palette CU, Joint Collaborative Team on Video Coding (JCT-VC) of ITU-T SG 16 WP 3 and ISO/IEC JTC 1/SC 29/WG 11, 18th Meeting: Sapporo, Japan, Jun. 30-Jul. 9, 2014, JCTVC-R0076r1 (Saved Jul. 2, 2014).

Huang, et al., SCCE3: Summary Report of CE on Palette Mode, Joint Collaborative Team on Video Coding (JCT-VC) of ITU-T SG 16 WP 3 and ISO/IEC JTC 1/SC 29/WG 11, 18th Meeting: Sapporo, Japan, Jun. 30-Jul. 9, 2014, JCTVC-R0033 (Saved Jul. 1, 2014).

Guo, et al., AHG8: Major-color-based screen content coding, Joint Collaborative Team on Video Coding (JCT-VC) of ITU-T SG 16 WP 3 and ISO/IEC JTC 1/SC 29/WG 11, 15th Meeting, JCTVC-O0182, Oct. 23-Nov. 1, 2013.

Yu, et al., Common conditions for screen content coding tests, Joint Collaborative Team on Video Coding (JCT-VC) of ITU-T SG 16 WP 3 and ISO/IEC JTC 1/SC 29/WG 11, 18th Meeting, JCTVC-R1015, Jun. 30-Jul. 9, 2014 (Saved Aug. 8, 2014).

* cited by examiner

Fig. 9

ENCODING PROCESS USING A PALETTE MODE

CROSS-REFERENCE TO RELATED APPLICATIONS

The application is the National Phase application of PCT Application No. PCT/EP2015/073062, filed on Oct. 6, 2015 and titled "Improved Encoding Process Using A Palette Mode." This application claims the benefit under 35 U.S.C. § 119(a)-(d) of United Kingdom Patent Application No. 1417652.3, filed on Oct. 6, 2014 and titled "Improved Encoding Process Using A Palette Mode." The above cited patent application is incorporated herein by reference in its entirety.

FIELD OF THE INVENTION

The present invention relates to video coding and decoding. More precisely, the present invention relates to palette mode coding methods. Palette mode is a coding method that was initially presented in the scope of HEVC Range Extension and is now under consideration for the Screen Content Coding extension of HEVC. This coding method is efficient for video coding targeting "screen content" video sequences.

BACKGROUND OF THE INVENTION

The invention applies to a mode of coding where a current block of pixels is encoded using a block of indexes, the latter being built from a so-called palette.

A palette in this document is defined as a look up table having entries associating an index with a value of a pixel. Typically, but not necessary, the value of a pixel is constituted by the value of each colour component associated with the pixel, resulting in a colour palette. On the other hand, the value of a pixel may be made of a single pixel component, resulting in a monochrome palette.

This mode of encoding a block of pixel is generally referred to as Palette coding mode. It was contemplated to adopt this mode, for example, in the Range Extension of the High Efficiency Video Coding (HEVC: ISO/IEC 23008-2 MPEG-H Part 2/ITU-T H.265) international standard. This mode is now under consideration in the draft specification of the Screen Content Coding (SCC) extension of HEVC.

When encoding an image in a video sequence, the image is first divided into coding entities of pixels of equal size referred to as Coding Tree Block (CTB). The size of a Coding Tree Block is typically 64 by 64 pixels. Each Coding Tree Block may then be broken down into a hierarchical tree of smaller blocks which size may vary and which are the actual blocks of pixels to encode. These smaller blocks to encode are referred to as Coding Unit (CU).

The encoding of a particular Coding Unit is typically predictive. This means that a predictor block is first determined. Next, the difference between the predictor block and the Coding Unit is calculated. This difference is called the residual or residual block. Next, this residual is compressed. The actual encoded information of the Coding Unit is made of some information to indicate the way of determining the predictor block and the compressed residual. Best predictor blocks are blocks as similar as possible to the Coding Unit in order to get a small residual that could be efficiently compressed.

The coding mode is defined based on the method used to determine the predictor block for the predictive encoding method of a Coding Unit.

A first coding mode is referred to as INTRA mode. According to INTRA mode, the predictor block is built based on the value of pixels immediately surrounding the Coding Unit within the current image. It is worth noting that the predictor block is not a block of the current image but a construction. A direction is used to determine which pixels of the border are actually used to build the predictor block and how they are used. The idea behind INTRA mode is that, due to the general coherence of natural images, the pixels immediately surrounding the Coding Unit are likely to be similar to pixels of the current Coding Unit. Therefore, it is possible to get a good prediction of the value of pixels of the Coding Unit using a predictor block based on these surrounding pixels.

A second coding mode is referred to as INTER mode. According to INTER mode, the predictor block is a block of another image. The idea behind the INTER mode is that successive images in a sequence are generally very similar. The main difference comes typically from a motion between these images due to the scrolling of the camera or due to moving objects in the scene. The predictor block is determined by a vector giving its location in a reference image relatively to the location of the Coding Unit within the current image. This vector is referred to as a motion vector. According to this mode, the encoding of such Coding Unit using this mode comprises motion information comprising the motion vector and the compressed residual.

Focus is made in this document on a third coding mode called Palette mode. According to a former version of the Palette mode, a predictor block is defined for a given Coding Unit as a block of indexes from a palette: for each pixel location in the predictor block, the predictor block contains the index associated with the pixel value in the Palette which is the closest to the value of the pixel having the same location (i.e. colocated) in the Coding Unit. The predictor block has thus the same size as the Coding Unit. A residual representing the difference between the predictor block (in pixel domain) and the Coding Unit is then calculated. The residual has also the same size as the Coding Unit and the predictor block.

Entry indexes in the Palette are also known as "levels".

In a recent version of the Palette mode under consideration in HEVC SCC, no residual is built and transmitted to the decoder (as in FIG. 7 described below). Only the block of indexes formed using the palette is coded in the bitstream to represent the current block of pixels.

Some pixels may be badly represented by the best palette entry, meaning that the difference between the pixels and the best palette entry is high. It may not be worth using an index for representing such pixels.

The Palette mode thus makes it possible to identify such pixels and to encode their explicit pixel value instead of using an approximating index. Such approach is particularly important where no residual (representing the approximation made by the palette entry) is transmitted. Such pixels whose pixel value is explicitly coded are named "escaped pixels" and no corresponding index is provided in the block of indexes that is associated with a pixel value in the palette. In current implementation of HEVC, the "escaped pixels" are signalled in the block of indexes using an entry index of the palette that is not associated with a pixel value.

In such implementation of the Palette mode, a block of escaped pixel values is built in addition to the block of indexes and to the palette, to store the escaped pixel values.

The predictor block (i.e. the block of indexes), the block of escaped pixel values, and possibly the residual and the palette are encoded to be added to a bitstream representing the encoded current Coding Unit.

To encode the block of indexes for the Palette mode, a plurality of sets of syntax elements are used, each set setting an operation for generating a corresponding group of indexes having successive block positions in the block of indexes.

In the current draft specification of the Screen Content Coding extension of HEVC, a "copy up" prediction and a "left value" prediction are proposed to encode each index of the block of indexes with reference to the index either above in the block matrix, or on its left.

One syntax element, referred to as "Pred mode", defines the operation or prediction mode selected for the corresponding group of indexes in the block of indexes, i.e. for each current index of the block as long as the Run defined above is not ended. An optional (function of the "Pred mode") second syntax element, referred to as "Level", specifies a new index value for the corresponding group of indexes in the "left value" prediction mode only. And a third and last syntax element, referred to as "Run", specifies on how many successive block positions the operation defined by the "Pred mode" syntax element is applied. In other words, it defines a number of indexes (having successive block positions) in the corresponding group of indexes.

Present embodiments of the invention improve the coding efficiency of the Palette mode.

SUMMARY OF THE INVENTION

In a first aspect, the present invention provides a method of decoding a current block of pixels in an image from a bitstream, the method comprising:
obtaining a block of indexes, escaped pixel values and a palette, the palette comprising a set of entries associating respective entry indexes with corresponding pixel values, and the escaped pixel values comprising pixel values for pixels having no corresponding index in the block of indexes that are associated with a pixel value in the palette; and
forming a decoded current block of pixels from the block of indexes, the escaped pixel values and the palette;
wherein obtaining the block of indexes comprises:
obtaining, from the bitstream, syntax elements, for generating groups of indexes having successive block positions in the block of indexes;
generating the indexes of the block of indexes based on the syntax elements,
wherein the syntax elements obtained include a syntax element indicated by an up-to-end codeword that indicates that indexes forming one of the groups of indexes are the indexes at all remaining block positions up to the end of the block of indexes, regardless of the number of remaining block positions.

In a second aspect, the present invention provides a method of encoding a current block of pixels in an image, the method comprising:
generating a block of indexes and escaped pixel values from the current block of pixels and a palette, the palette comprising a set of entries associating respective entry indexes with corresponding pixel values, and the escaped pixel values comprising pixel values for pixels having no corresponding index in the block of indexes that are associated with a pixel value in the palette; and
encoding the block of indexes and the escaped pixel values;
wherein encoding the block of indexes comprises:
generating syntax elements, for generating groups of indexes having successive block positions in the block of indexes;
wherein the syntax elements include a syntax element indicated by an up-to-end codeword that indicates that indexes forming one of the groups of indexes are the indexes at all remaining block positions up to the end of the block of indexes, regardless of the number of remaining block positions.

In embodiments of the first and second aspects, the up-to-end codeword may comprise a flag. The escaped pixel values may comprise a block of such escaped pixel values.

In embodiments, the syntax elements use a predefined codeword associated with a defined number of indexes, and corresponding to a group of indexes of the block of indexes, and a syntax element, corresponding to last block positions in the block of indexes uses the up-to-end codeword.

The predefined codewords associated with defined numbers of indexes may be short codewords and other predefined codewords associated with other defined numbers of indexes may be made up of a common codeword prefix and of a variable codeword suffix; and the up-to-end codeword may include the common codeword prefix. For example, the up-to-end codeword may include a one-bit suffix in addition to the common codeword prefix.

In embodiments, the syntax elements are provided in sets and generating a group of indexes corresponding to a set of syntax elements depends on a first syntax element of the set, the operation used to generate the indexes being one of:
repeating an index having the block position just above; and
repeating an index coded in a second syntax element of the set.

In a further aspect there is provided a non-transitory computer-readable medium storing a program which, when executed by a microprocessor or computer system in a device, causes the device to perform the method of any of the above mentioned aspects and embodiments.

In another aspect there is provided a computer program which upon execution causes the method of any preceding aspect or embodiment to be performed. The computer program may be embodied on a carrier such as a machine readable medium.

In other aspects, there is provided a bitstream generated using the second aspect or embodiments thereof and a storage medium upon which is stored said bitstream. Such a storage medium could take the form of a Blu-Ray disc, DVD, CD-ROM or another device readable medium, for example.

In another aspect, there is provided a device comprising means adapted for carrying out the method of any of the above aspects or embodiments.

In a further aspect of the present invention, there is provided a decoding device for decoding a current block of pixels in an image from a bitstream, the decoding device comprising:
means for obtaining a block of indexes, escaped pixel values and a palette, the palette comprising a set of entries associating respective entry indexes with corresponding pixel values, and the escaped pixel values comprising pixel values for pixels having no corresponding index in the block of indexes that are associated with a pixel value in the palette; and
means for forming a decoded current block of pixels from the block of indexes, the escaped pixel values and the palette;

wherein obtaining the block of indexes comprises:
obtaining, from the bitstream, syntax elements, for generating groups of indexes having successive block positions in the block of indexes; and
generating the indexes of the block of indexes based on the syntax elements,
wherein the syntax elements obtained include a syntax element indicated by an up-to-end codeword that indicates that the indexes forming one of the group of indexes are the indexes at all remaining block positions up to the end of the block of indexes, regardless of the number of remaining block positions.

In yet another aspect of the present invention, there is provided an encoding device for encoding a current block of pixels in an image, the encoding device comprising:
means for generating a block of indexes and escaped pixel values from the current block of pixels and a palette, the palette comprising a set of entries associating respective entry indexes with corresponding pixel values, and the escaped pixel values comprising pixel values for pixels having no corresponding index in the block of indexes that are associated with a pixel value in the palette; and
means for encoding the block of indexes and the escaped pixel values;
wherein encoding the block of indexes comprises:
generating syntax elements, for generating groups of indexes having successive block positions in the block of indexes;
wherein the syntax elements include a syntax element indicated by an up-to-end codeword that indicates that indexes forming one of the corresponding group of indexes are the indexes at all remaining block positions up to the end of the block of indexes, regardless of the number of remaining block positions.

In another aspect, the present invention provides a method of decoding a current block of pixels in an image from a bitstream, the method comprising:
obtaining a block of indexes, escaped pixel values and a palette, the palette comprising a set of entries associating respective entry indexes with corresponding pixel values, and the escaped pixel values comprising pixel values for pixels having no corresponding index in the block of indexes that are associated with a pixel value in the palette; and
forming a decoded current block of pixels from the block of indexes, the escaped pixel values and the palette;
wherein obtaining the block of indexes comprises:
obtaining, from the bitstream, syntax elements, for generating groups of indexes having successive block positions in the block of indexes where the number of successive block positions is indicated by a run;
generating the indexes of the block of indexes based on the syntax elements,
wherein the syntax elements obtained include a flag in the bitstream that indicates when the run of a group of indexes is the last run in the block being decoded. In a further aspect a device is provided have means for performing or a processor configured to perform said method of decoding and a computer program which when executed causes said method of decoding to be performed.

In a second aspect, the present invention provides a method of encoding a current block of pixels in an image, the method comprising:
generating a block of indexes and escaped pixel values from the current block of pixels and a palette, the palette comprising a set of entries associating respective entry indexes with corresponding pixel values, and the escaped pixel values comprising pixel values for pixels having no corresponding index in the block of indexes that are associated with a pixel value in the palette; and
encoding the block of indexes and the escaped pixel values;
wherein encoding the block of indexes comprises:
generating syntax elements, for generating groups of indexes having successive block positions in the block of indexes the number of successive block positions of a group of indexes being indicated by a run;
wherein the syntax elements include a flag in the bitstream that indicates when the run of a group of indexes is the last run in the block being encoded. In a further aspect a device is provided have means for or a processor configured to perform said method of encoding and a computer program which when executed causes said method to be performed.

The last set of syntax elements (i.e. the set for the last pixels in the Coding Unit) often applies for a large number of pixels (indexes), in particular for the last Coding Unit of an image because the end of an image is usually monotonous. Using such an "up-to-end" value or flag thus improves coding efficiency, since it may avoid using a large amount of bits to encode the value representing the large number of indexes concerned by the last "Run".

In addition, control on the number of indexes being processed for the last set of syntax elements (in particular in a decoding loop) may be avoided. This is because it is known, thanks to the "up-to-end" value or flag, that all the remaining indexes are involved.

In an aspect, the invention provides a method of decoding a current block of pixels in an image from a bitstream, the method comprising:
obtaining a block of indexes, a block of escaped pixel values and a palette, the palette comprising a set of entries associating respective entry indexes with corresponding pixel values, and the block of escaped pixel values comprising pixel values for pixels having no corresponding index in the block of indexes that is associated with a pixel value in the palette; and
forming a decoded current block of pixels from the block of indexes, the block of escaped pixel values and the palette;
wherein obtaining the block of indexes comprises:
obtaining, from the bitstream, a plurality of sets of syntax elements, each set setting an operation for generating a corresponding group of indexes having successive block positions in the block of indexes;
generating the indexes of the block of indexes based on the sets of syntax elements,
wherein a syntax element (for instance the Run element in the Screen Content Coding draft specification of HEVC) provided in each set uses a codeword selected from at least two available codewords, including an up-to-end codeword to indicate that the indexes forming the corresponding group of indexes are the indexes at all remaining block positions up to the end of the block of indexes, regardless the number of such remaining block positions.

The use of a codeword means that such a codeword is set in the provided syntax element.

There is also provided a method of coding a current block of pixels in an image, the method comprising:
generating a block of indexes and a block of escaped pixel values from the current block of pixels and from a palette, the palette comprising a set of entries associating respective entry indexes with corresponding pixel values, and the block of escaped pixel values comprising pixel values for pixels having no corresponding index in the block of indexes that is associated with a pixel value in the palette; and coding the block of indexes and the block of escaped pixel values;

wherein coding the block of indexes comprises:

generating a plurality of sets of syntax elements, each set setting an operation for a decoder to generate a corresponding group of indexes having successive block positions in the block of indexes;

wherein a syntax element provided in each set uses a codeword selected from a set of at least two available codewords, including an up-to-end codeword to indicate that the indexes forming the corresponding group of indexes are the indexes at all remaining block positions up to the end of the block of indexes, regardless the number of such remaining block positions.

Correspondingly, the above-mentioned embodiments of the invention provide a decoding device for decoding a current block of pixels in an image from a bitstream, the decoding device comprising at least one microprocessor configured for carrying out the steps of:

obtaining a block of indexes, a block of escaped pixel values and a palette, the palette comprising a set of entries associating respective entry indexes with corresponding pixel values, and the block of escaped pixel values comprising pixel values for pixels having no corresponding index in the block of indexes that is associated with a pixel value in the palette; and forming a decoded current block of pixels from the block of indexes, the block of escaped pixel values and the palette;

wherein obtaining the block of indexes comprises:

obtaining, from the bitstream, a plurality of sets of syntax elements, each set setting an operation for generating a corresponding group of indexes having successive block positions in the block of indexes;

generating the indexes of the block of indexes based on the sets of syntax elements, wherein a syntax element provided in each set uses a codeword selected from at least two available codewords, including an up-to-end codeword to indicate that the indexes forming the corresponding group of indexes are the indexes at all remaining block positions up to the end of the block of indexes, regardless of the number of such remaining block positions.

There is also provided a coding device for coding a current block of pixels in an image, the coding device comprising at least one microprocessor configured for carrying out the steps of:

generating a block of indexes and a block of escaped pixel values from the current block of pixels and from a palette, the palette comprising a set of entries associating respective entry indexes with corresponding pixel values, and the block of escaped pixel values comprising pixel values for pixels having no corresponding index in the block of indexes that is associated with a pixel value in the palette; and coding the block of indexes and the block of escaped pixel values;

wherein coding the block of indexes comprises:

generating a plurality of sets of syntax elements, each set setting an operation for a decoder to generate a corresponding group of indexes having successive block positions in the block of indexes;

wherein a syntax element provided in each set uses a codeword selected from a set of at least two available codewords, including an up-to-end codeword to indicate that the indexes forming the corresponding group of indexes are the indexes at all remaining block positions up to the end of the block of indexes, regardless the number of such remaining block positions.

Optional features of these embodiments are defined in appended claims. Some of these features are explained here below with reference to a method, and can be transposed into system features dedicated to a device according to embodiments of the invention.

In some embodiments, the set of at least two available codewords for the provided syntax element comprises predefined codewords associated with defined numbers of indexes, and wherein the provided syntax element uses one of such predefined codewords for each set corresponding to a group of indexes of the block of indexes, except the set, referred to as last set, corresponding to last block positions in the block of indexes, and the provided syntax element of the last set uses the up-to-end codeword.

This provision saves coding efficiency by inserting an additional codeword (the up-to-end codeword) for a known syntax element.

According to specific embodiments, some predefined codewords associated with defined numbers of indexes are short codewords and other predefined codewords associated with other defined numbers of indexes are made of a common codeword prefix and of a codeword suffix that differs from one other predefined codeword to the other; and wherein the up-to-end codeword includes the common codeword prefix.

The short codewords are usually shorter than or equal to (in terms of bits) the common codeword prefix.

This configuration provides efficient coding. This is because, since the up-to-end codeword is used at most once in a coding unit (block of pixels), it is more efficient to keep short codewords for most frequent numbers of indexes.

In a specific embodiment, the up-to-end codeword includes a one-bit suffix in addition to the common codeword prefix. In other words, the shortest codeword having the common codeword prefix is used for the "up-to-end" codeword. This intends to keep coding efficiency In a variant to using an up-to-end codeword made of the common codeword prefix and of a suffix, the up-to-end codeword may be a specific short codeword (i.e. without the common codeword prefix).

In embodiment, the operation for generating the group of indexes corresponding to a set of syntax elements depends on a first syntax element (e.g. the Pred_mode element) of the set, the operation used to generate the indexes being one of:

repeating an index having the block position just above. This is the "copy up" or "copy above" mode of HEVC; and repeating an index coded in a second syntax element (e.g. the Level element) of the set. This is the mode known as "copy left mode", or "left prediction mode" or "index mode" in HEVC standard.

Other embodiments of the invention are directed to a method for coding a current block of pixels in an image, comprising:

evaluating (or testing, i.e. estimating a coding cost in order to select the best one from amongst the tested coding modes) the coding of the current block of pixels for each of two or more coding modes including a palette coding mode, the palette coding mode using a current palette to build a block of indexes (used to encode the current block of pixels in the bitstream), the current palette comprising a set of entries associating respective entry indexes with corresponding pixel values:

selecting a coding mode from the two or more coding modes to code the current block of pixels, based on the evaluations;

wherein evaluating the coding of the current block of pixels using the palette coding mode comprises: successively considering the pixels of the current block and for each considered pixel:

searching in the palette for a palette entry having a corresponding pixel value close enough to the considered pixel, given a distance threshold;

encoding the considered pixel using an entry index if a palette entry is found in the palette that is close enough to the considered pixel, given the distance threshold;

escape coding the considered pixel if no palette entry is found in the palette that is close enough to the considered pixel, given the distance threshold, the escape coding including the explicit coding of the value of the considered pixel; and wherein the evaluating of the coding of the current block of pixels using the palette coding mode is aborted if the number of escape-coded pixels exceeds a predefined threshold for the current block of pixels.

Correspondingly, a coding device for coding a current block of pixels in an image comprises at least one microprocessor configured for carrying out the steps of:

evaluating the coding of the current block of pixels for each of two or more coding modes including a palette coding mode, the palette coding mode using a current palette to build a block of indexes, the current palette comprising a set of entries associating respective entry indexes with corresponding pixel values:

selecting a coding mode from the two or more coding modes to code the current block of pixels, based on the evaluations;

wherein evaluating the coding of the current block of pixels using the palette coding mode comprises: successively considering the pixels of the current block and for each considered pixel:

searching in the palette for a palette entry having a corresponding pixel value close enough to the considered pixel, given a distance threshold;

encoding the considered pixel using an entry index if a palette entry is found in the palette that is close enough to the considered pixel, given the distance threshold;

escape coding the considered pixel if no palette entry is found in the palette that is close enough to the considered pixel, given the distance threshold, the escape coding including the explicit coding of the value of the considered pixel; and wherein the evaluating of the coding of the current block of pixels using the palette coding mode is aborted if the number of escape-coded pixels exceeds a predefined threshold for the current block of pixels.

Thanks to this provision, processing time may be saved. This is because a large number of escape-coded pixels makes the palette coding mode very less efficient compared to other coding modes. As a consequence, as soon as this large number is known, it is not worth wasting time for processing operations that are useless for the encoding of the current Coding Unit.

Optional features of these embodiments are defined in appended claims. Some of these features are explained here below with reference to a method, while they can be transposed into system features dedicated to a device according to embodiments of the invention.

In embodiments, the predefined threshold depends on the number of pixels in the current block of pixels, for instance 30%.

In other embodiments, the process further comprises incrementing a counter each time a pixel is escape coded; wherein the evaluating of the coding of the current block of pixels using the palette coding mode is aborted as soon as the counter reached the predefined threshold. This approach is optimal to save processing time.

In yet other embodiments, evaluating the coding of the current block of pixels using the palette coding mode further comprises:

if no palette entry is found in the palette that is close enough to the considered pixel, given the distance threshold, adding the considered pixel as a new palette entry in the palette;

once all pixels of the block of pixels have been considered, removing at least one palette entry from the palette.

This provision makes it possible to dynamically build a palette that reflects the pixels of the current Coding Unit and that meets memory requirements.

In a particular embodiment, evaluating the coding of the current block of pixels using the palette coding mode further comprises:

upon finding a palette entry or adding a new palette entry, incrementing an occurrence counter associated with the found or new palette entry; and comparing the sum of the occurrence counters of the removed palette entries with the predefined threshold to decide abortion or not of the evaluating.

Other inventive (and independent) embodiments of the invention are directed to a method for coding a current block of pixels in an image using a palette coding mode, comprising:

building a block of indexes from the current block of pixels and a current palette, the current palette comprising a set of entries associating respective entry indexes with corresponding pixel values:

encoding the block of indexes;

wherein building a block of indexes for the current block of pixels comprises, for each pixel of the current block of pixels, searching in the palette for a palette entry having a corresponding pixel value close enough to the considered pixel, given a distance threshold; adding the entry index of a found palette entry to the block of indexes; and storing the current pixel and the entry index of the found palette entry in memory;

wherein if a value of the current pixel equals a value of a preceding pixel in the current block of pixels, retrieving the entry index stored in memory for the preceding pixel and adding the retrieved index to the predictor block of indexes as the entry index for the current pixel.

Correspondingly, a coding device for coding a current block of pixels in an image comprises at least one microprocessor configured for carrying out the steps of:

building a block of indexes from the current block of pixels and a current palette, the current palette comprising a set of entries associating respective entry indexes with corresponding pixel values:

encoding the block of indexes;

wherein building a block of indexes for the current block of pixels comprises, for each pixel of the current block of pixels, searching in the palette for a palette entry having a corresponding pixel value close enough to the considered pixel, given a distance threshold; adding the entry index of a found palette entry to the block of indexes; and storing the current pixel and the entry index of the found palette entry in memory;

wherein if a value of the current pixel equals a value of a preceding pixel in the current block of pixels, retrieving the entry index stored in memory for the preceding pixel and adding the retrieved index to the block of indexes as the entry index for the current pixel.

These inventive embodiments make it possible to avoid performing an exhaustive search for an index in the palette. On average, the additional processing costs for testing the equality between pixels is less that the processing costs saved by not performing the exhaustive search, because images (in particular screen content images) often have a high level of pixel redundancy.

Although the "preceding pixel" may be any of the pixels already processed in the Coding Unit, it may be worth limiting the number of possible "preceding pixels" in order to limit the amount of pixel comparisons and to limit the memory necessary to save the preceding pixels. In a preferred embodiment, the preceding pixel is the pixel that immediately precedes the current pixel in the current block of pixels. In other words, the last index found in the palette is kept in memory to be reused for the next pixel if it is the same as the last one processed. In a variant, the two or more pixels that immediately precede the current pixel may be considered.

Note that preferably, only one entry index and only one "preceding" pixel is stored in memory at any time. This reduces the needs of memory.

In a variant to considering the pixel immediately preceding the current pixel, the preceding pixel is the last pixel of the current block of pixels for which a palette entry index has been added to the block of indexes. This provision makes it possible to take into account the escaped pixels for which no palette entry can be found and thus no entry index is added to the block of levels.

In another variant, the preceding pixel is the pixel that is positioned above the current pixel in the current block of pixels.

In some embodiments, the method further comprises comparing the value of the current pixel to the value stored in memory for the preceding pixel, to determine whether or not the value of the current pixel equals the value of the preceding pixel.

Note that usually the closest palette entry (given the threshold) is selected to provide the corresponding entry index as the index in the block of indexes for the current pixel.

Other inventive (and independent) embodiments of the invention are directed to a method for coding a current block of pixels in an image using a palette coding mode, the palette coding mode using a current palette that comprises a set of entries associating respective entry indexes with corresponding pixel values, the method comprising:

evaluating (or testing, i.e. estimating a coding cost in order to select the best one from amongst the tested coding modes) the coding of the current block of pixels using two or more palette prediction modes for predicting the current palette, wherein a first palette prediction mode uses a preceding palette of a preceding block of pixels in the image to code the current block of pixels rather than the current palette;

the method further comprising:

determining an amount of palette entries of the preceding palette that are reused in the current palette; and skipping the evaluating of the coding of the current block of pixels using the first palette prediction mode if it is determined that the amount of reused palette entries is below a predefined threshold.

Correspondingly, a coding device for coding a current block of pixels in an image using a palette coding mode, the palette coding mode using a current palette that comprises a set of entries associating respective entry indexes with corresponding pixel values, comprised at least one microprocessor configured for carrying out the steps of:

evaluating the coding of the current block of pixels using two or more palette prediction modes for predicting the current palette, wherein a first palette prediction mode uses a preceding palette of a preceding block of pixels in the image to code the current block of pixels rather than the current palette;

determining an amount of palette entries of the preceding palette that are reused in the current palette; and skipping the evaluating of the coding of the current block of pixels using the first palette prediction mode if it is determined that the amount of reused palette entries is below a predefined threshold.

This approach makes it possible to early detect cases where a palette sharing evaluation is ineffective, and thus skip it as early as possible.

Another aspect of the invention relates to a non-transitory computer-readable medium storing a program which, when executed by a microprocessor or computer system in a device, causes the device to perform any method as defined above.

The non-transitory computer-readable medium may have features and advantages that are analogous to those set out above and below in relation to the method and device, in particular that of improving coding efficiency of the Palette coding mode.

Yet another aspect of the invention relates to a device comprising means adapted for carrying out each step of any method as defined above.

Yet other aspects of the invention relate to a method of coding or decoding a current block of pixels in an image, substantially as herein described with reference to, and as shown in, FIG. 17 or 18 or 19 or 20 or 21 of the accompanying drawings.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

Figure 9:
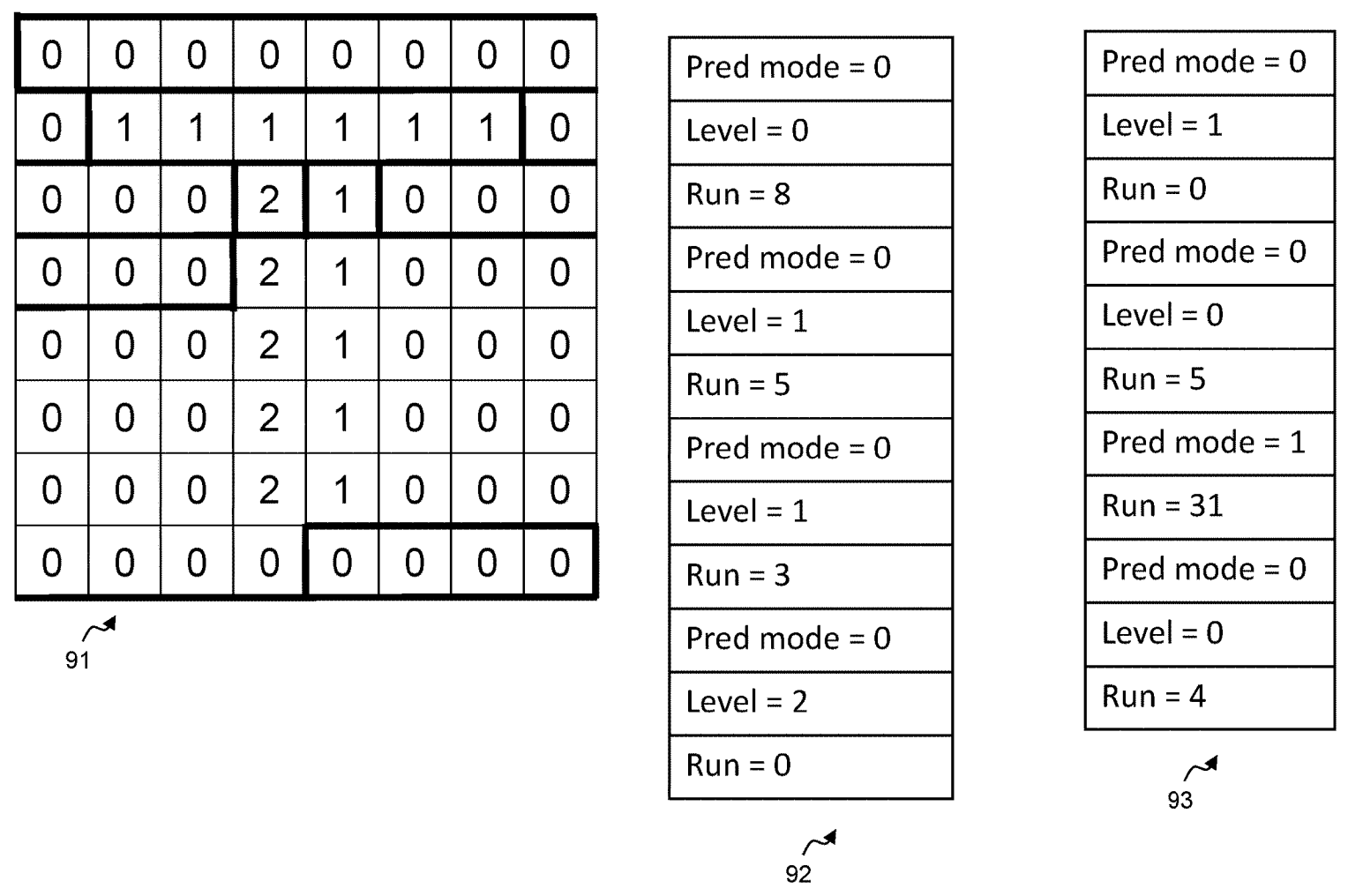

FIG. 9 illustrates the same block of levels and the set of syntax elements used for the encoding of this block of levels;

DETAILED DESCRIPTION OF EMBODIMENTS OF THE INVENTION

Figure 1:
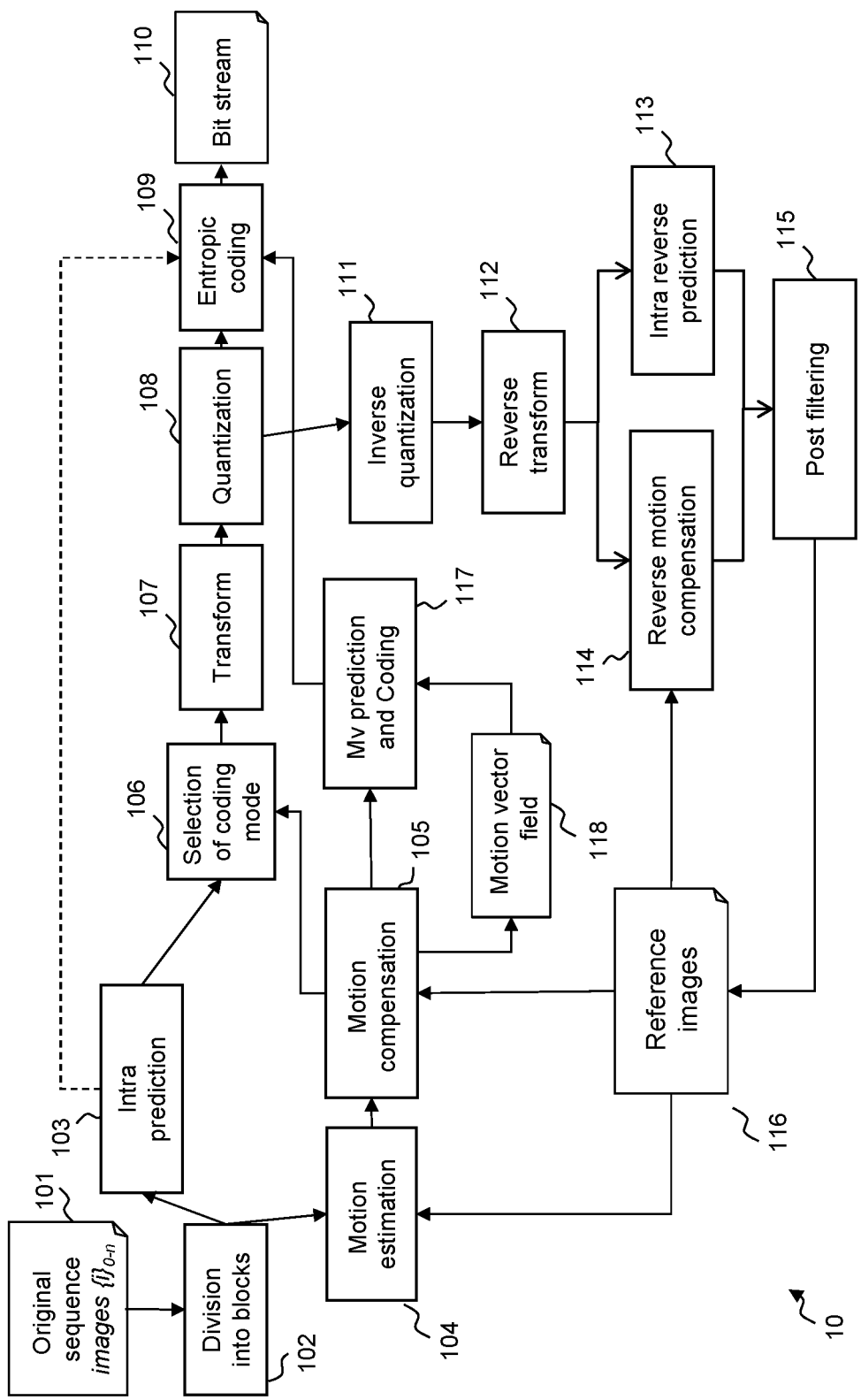
FIG. 1 illustrates the HEVC encoder architecture.

FIG. 1 illustrates the HEVC encoder architecture. In the video encoder, an original sequence 101 is divided into blocks of pixels 102. A coding mode is then affected to each block. There are two families of coding modes typically used in HEVC: the modes based on spatial prediction (INTRA modes) 103 and the modes based on temporal prediction (INTER, Bidir, Skip modes) based on motion estimation 104 and motion compensation 105. An extension of HEVC being currently designed, known as HEVC Screen Content Coding extension, adds an additional coding mode, namely the Palette coding mode that competes with INTRA and INTER coding modes to encode blocks of pixels. This Palette coding mode is described with more details below, in particular with reference to FIGS. 6 to 13, 15 and 16.

An INTRA Coding Unit is generally predicted from the encoded pixels at its causal boundary by a process called INTRA prediction.

Temporal prediction of INTER coding mode first consists in finding in a previous or future frame called the reference frame 116 the reference area which is the closest to the Coding Unit in a motion estimation step 104. This reference area constitutes the predictor block. Next this Coding Unit is predicted using the predictor block to compute the residual in a motion compensation step 105.

In both cases, spatial and temporal prediction, a residual is computed by subtracting the Coding Unit from the original predictor block.

In the INTRA prediction, a prediction direction is encoded. In the temporal prediction, at least one motion vector is encoded. However, in order to further reduce the bitrate cost related to motion vector encoding, a motion vector is not directly encoded. Indeed, assuming that motion is homogeneous, it is particularly interesting to encode a motion vector as a difference between this motion vector, and a motion vector in its surrounding. In H.264/AVC coding standard for instance, motion vectors are encoded with respect to a median vector computed between three blocks located above and on the left of the current block. Only a difference, also called residual motion vector, computed between the median vector and the current block motion vector is encoded in the bitstream. This is processed in module "Mv prediction and coding" 117. The value of each encoded vector is stored in the motion vector field 118. The neighboring motion vectors, used for the prediction, are extracted from the motion vector field 118.

Then, the mode optimizing the rate distortion performance is selected in module 106, for example using a Lambda-based criterion such as $D+\lambda \cdot R$, where D is the distortion, $\lambda$ a Lambda or Lagrangian coefficient and R the rate). In order to further reduce the redundancies, a transform, typically a DCT, is applied to the residual block in module 107, and a quantization is applied to the coefficients in module 108. The quantized block of coefficients is then entropy coded in module 109 and the result is inserted in the bitstream 110.

The encoder then performs a decoding of the encoded frame for the future motion estimation in modules 111 to 116. This is a decoding loop at the encoder. These steps allow the encoder and the decoder to have the same reference frames. To reconstruct the coded frame, the residual is inverse quantized in module 111 and inverse transformed in module 112 in order to provide the "reconstructed" residual in the pixel domain. According to the encoding mode (INTER or INTRA), this residual is added to the INTER predictor 114 or to the INTRA predictor 113.

Then, this first reconstruction is filtered in module 115 by one or several kinds of post filtering. These post filters are integrated in the decoding loop. It means that they need to be applied on the reconstructed frame at the encoder and decoder in order to use the same reference frames at the encoder and decoder. The aim of this post filtering is to remove compression artifacts.

For example, H.264/AVC uses a deblocking filter. This filter can remove blocking artifacts due to the DCT quantization of residual and to block motion compensation. In the current HEVC standard, two types of loop filters are used: deblocking filter, sample adaptive offset (SAO).

Figure 2:
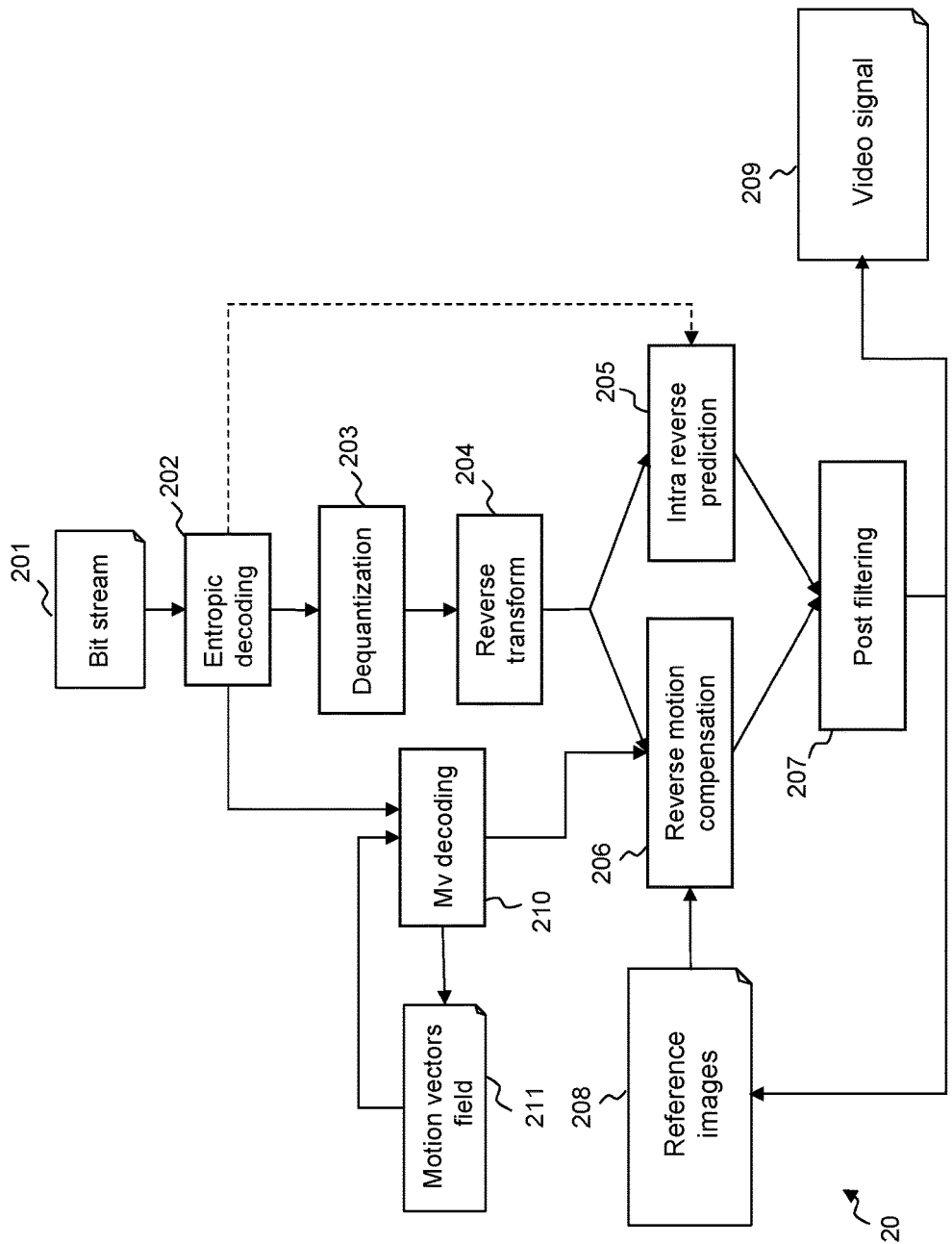
FIG. 2 illustrates the HEVC decoder architecture.

The principle of an HEVC decoder is represented in FIG. 2. The video stream 201 is first entropy decoded in a module 202. The residual data are then inverse quantized in a module 203 and inverse transformed in a module 204 to obtain pixel values forming a residual. The mode data are also entropy decoded and in function of the mode, an INTRA type decoding or an INTER type decoding is performed. In the case of INTRA mode, the INTRA prediction direction is decoded from the bitstream. The prediction direction is then used to locate the reference area 205. If the mode is INTER, the motion information is decoded from the bitstream 202. This is composed of the reference frame index and the motion vector residual. The motion vector predictor is added to the motion vector residual to obtain the motion vector 210. The motion vector is then used to locate the reference area in the reference frame 206. The reference area is added to the residual to reconstruct the decoded frame. Note that the motion vector field data 211 is updated with the decoded motion vector in order to be used for the prediction of the next decoded motion vectors. This first reconstruction of the decoded frame is then post filtered 207 with exactly the same post filter as used at encoder side. The output of the decoder is the de-compressed video 209.

Figure 3:
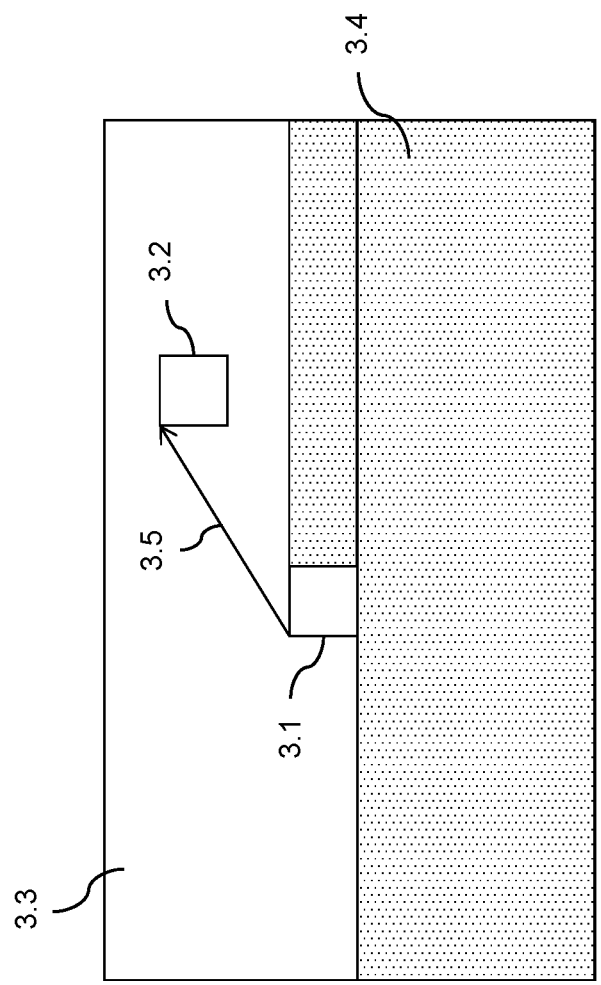
FIG. 3 illustrates the concept of the causal area.

FIG. 3 illustrates the causal principle resulting from block-by-block encoding as in HEVC.

At a high-level, an image is divided into Coding Units that are encoded in raster scan order. Thus, when coding block 3.1, all the blocks of area 3.3 have already been encoded, and can be considered available to the encoder. Similarly, when decoding block 3.1 at the decoder, all the blocks of area 3.3 have already been decoded and thus reconstructed, and can be considered as available at the decoder. Area 3.3 is called the causal area of the Coding Unit 3.1. Once Coding Unit 3.1 is encoded, it will belong to the causal area for the next Coding Unit. This next Coding Unit, as well as all the next ones, belongs to area 3.4 illustrated as a dotted area, and cannot be used for coding the current Coding Unit 3.1. It is worth noting that the causal area is constituted by reconstructed blocks. The information used to encode a given Coding Unit is not the original blocks of the image for the reason that this information is not available at decoding. The only information available at decoding is the reconstructed version of the blocks of pixels in the causal area, namely the decoded version of these blocks. For this reason, at encoding, previously encoded blocks of the causal area are decoded to provide this reconstructed version of these blocks.

It is possible to use information from a block 3.2 in the causal area when encoding a block 3.1. In the HEVC Screen Content Coding draft specifications, a displacement vector 3.5, which can be transmitted in the bitstream, may indicate this block 3.2.

Figure 5:
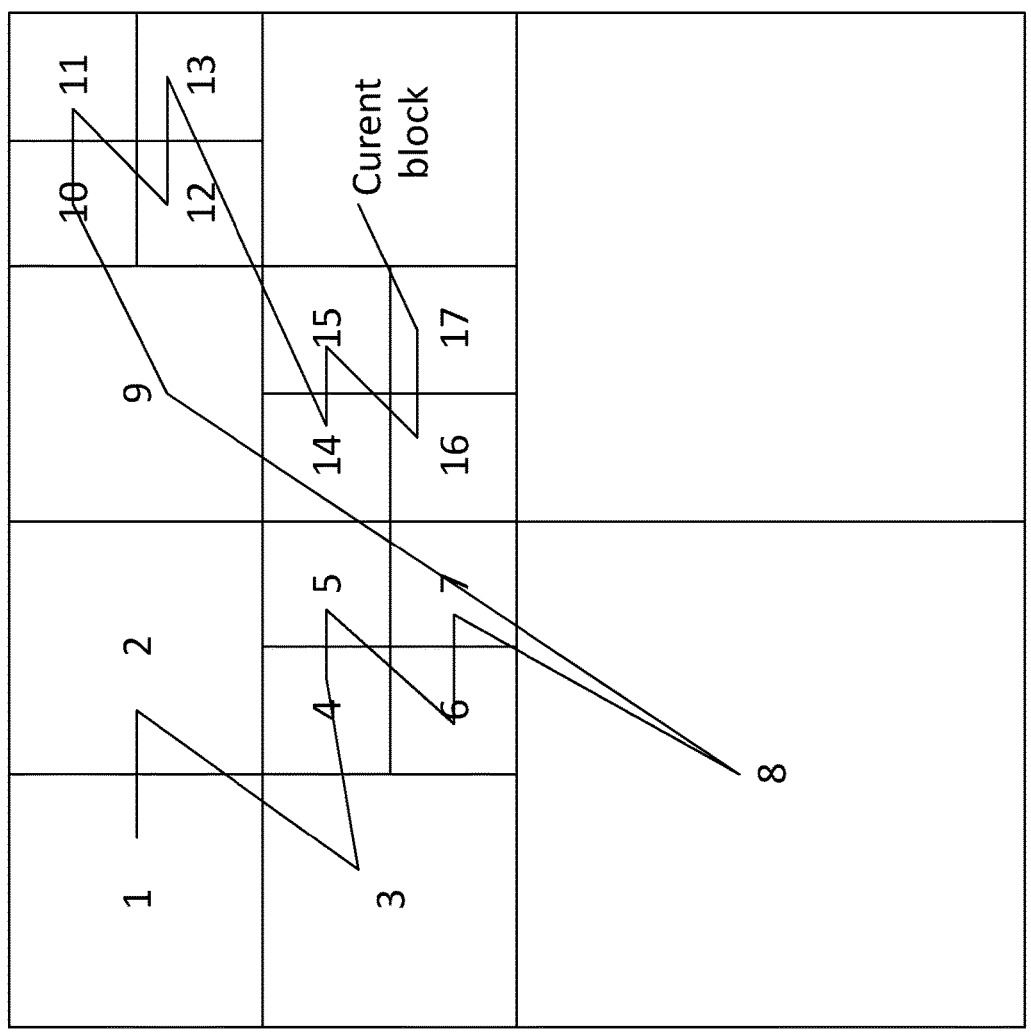
FIG. 5 illustrates the Coding Tree Block splitting in Coding Units and the scan order decoding of these Coding Unit.

FIG. 5 illustrates a splitting of a Coding Tree Block into Coding Units and an exemplary scan order to sequentially process of these Coding Units. In the HEVC standard, the block structure is organized by Coding Tree Blocks (CTBs). A frame contains several non-overlapped and square Coding Tree Block. The size of a Coding Tree Block can be equal to 64 pixels×64 pixels to 16×16. This size is determined at sequence level. The most efficient size, in terms of coding efficiency, is the largest one: 64×64. Note that all Coding Tree Blocks have the same size except for the image border, meaning that they are arranged in rows. The size of the boundary CTBs is adapted according to the amount of remaining pixels.

Each Coding Tree Block contains one or more square Coding Units (CU). The Coding Tree Block is split based on a quad-tree structure into several Coding Units. The processing (coding or decoding) order of each Coding Unit in the Coding Tree Block follows the quad-tree structure based on a raster scan order. FIG. 5 shows an example of the processing order of Coding Units in one Coding Tree Block. In this figure, the number in each Coding Unit gives the processing order of each corresponding Coding Unit of this Coding Tree Block.

The HEVC Range Extension, also commonly called HEVC RExt, is an extension of the new video coding standard HEVC to address extended video formats.

An aim of this extension is to provide additional tools to code video sequences with additional colour formats and bit-depth, and possibly losslessly. In particular, this extension is designed to support 4:2:2 colour format as well as 4:4:4 video format in addition to 4:2:0 video format (see FIG. 4). A colour image is generally made of three colour components R, G and B. These components are generally correlated, and it is very common in image and video compression to de-correlate the colour components prior to processing the images. The most common format that de-correlates the colour components is the YUV colour format. YUV signals are typically created from RGB representation of images, by applying a linear transform to the three inputs R, G and B input frames. Y is usually called Luma component, U and V are generally called Chroma components. The term 'YCbCr' is also commonly used in place of the term 'YUV'.

It is very common to use different sampling ratios for the three colour components. The subsampling scheme is commonly expressed as a three part ratio J:a:b (e.g. 4:2:2), that describes the number of luminance and chrominance samples in a conceptual region that is J pixels wide, and 2 pixels high. The parts are (in their respective order):

J: horizontal sampling reference (width of the conceptual region) (usually, 4).

a: number of chrominance samples (Cr, Cb) in the first row of J pixels.

b: number of (additional) chrominance samples (Cr, Cb) in the second row of J pixels.

Figure 4:
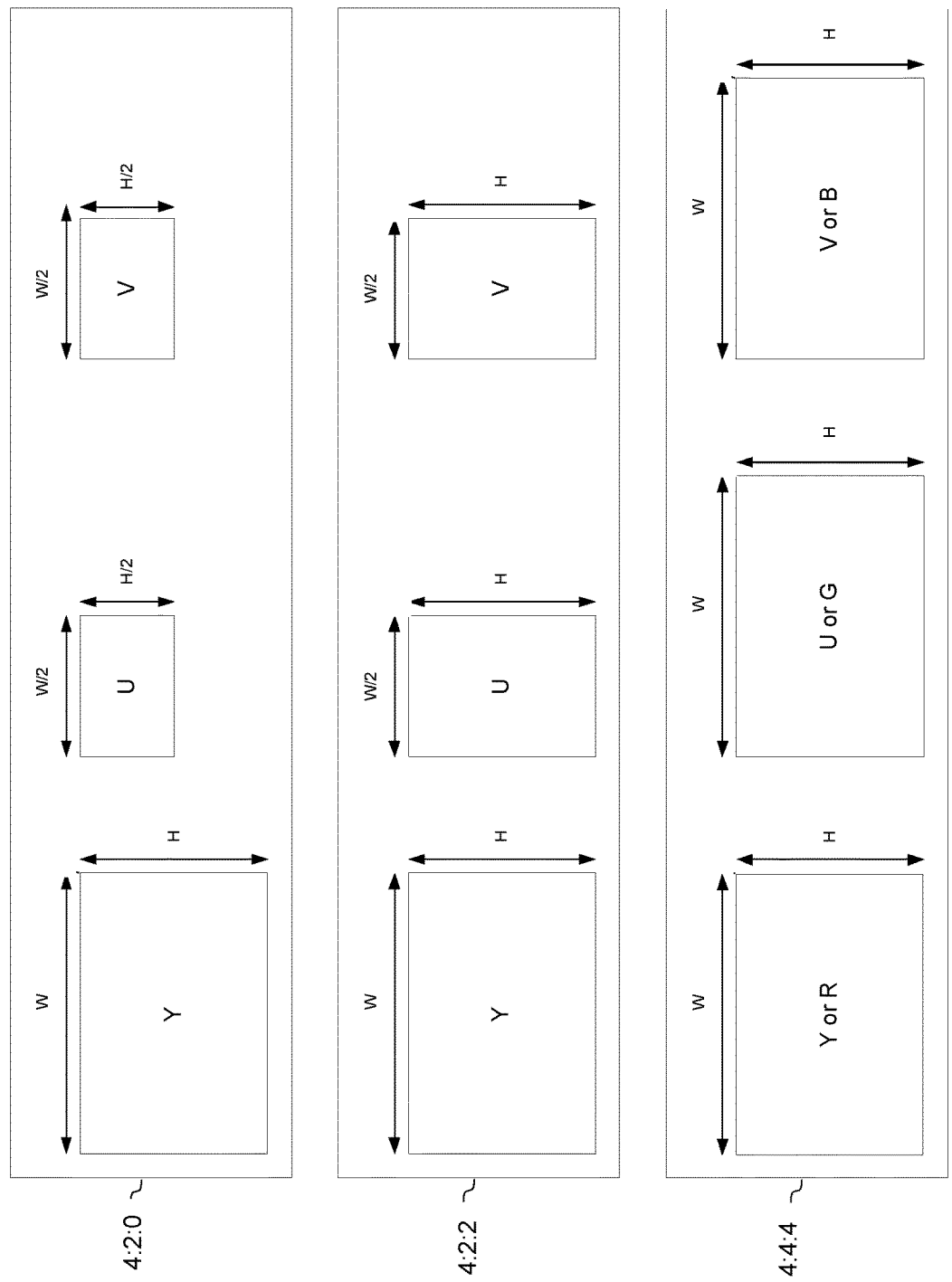
FIG. 4 illustrates Chroma formats supported by HEVC the Range and Screen Content Coding extensions.

FIG. 4 illustrates the different considered Chroma formats in HEVC RExt. These formats are different due to a different picture size of the three colour components, and to a different type of the colour components.

In the 4:2:0 YUV Chroma format, if the Y component region has a width equal to W pixels and a height equal to H pixels, the U and V components regions have both a width W/2 equal to pixels and a height equal to H/2 pixels.

In the 4:2:2 YUV Chroma format, if the Y component region has a width equal to W pixels and a height equal to H pixels, the U and V components regions have both a width equal to W/2 pixels and a height equal to H pixels.

In the 4:4:4 YUV or RGB Chroma format, the regions for three colour components have the same width W and height H.

When a picture is monochrome, its format is named 4:0:0.

Regarding the bit-depth which is the number of bits used to code each colour component of a pixel, if the current HEVC standard is able to deal with 4:2:0 colour format with 8 and 10 bits bit-depth (i.e. 256 to 1,024 possible colours), HEVC RExt is about to be designed to additionally support 4:2:2 and 4:4:4 video format with an extended bit-depth ranging from 8 bits up to 16 bits (i.e. up to 65,536 possible colours). This is particularly useful to have a larger dynamic range of colour components.

HEVC RExt is also designed to provide a lossless encoding of the input sequences; this is to have a decoded output 209 strictly identical to the input 101. To achieve this, a number of tools have been modified or added, compared to the conventional HEVC lossy codec. A non-exhaustive list of exemplary modifications or additions to operate losslessly is provided here below:

removal of the quantization step 108 (203 at the decoder);

forced activation of the bypass transform, because normal cosine/sine transforms 107 may introduce errors (204 at the decoder);

removal of tools specifically tailored at compensating quantization noise, such as post filtering 115 (207 at the decoder).

Additional tools are currently being designed to efficiently encode "screen content" video sequences in addition to natural sequences in a new extension called Screen Content Coding (SCC) of HEVC which is under consideration for standardization. The "screen content" video sequences refer to particular video sequences which have a very specific content corresponding to those captured from a personal computer of any other device containing for example text, PowerPoint presentation, Graphical User Interface, tables (e.g. screen shots). These particular video sequences generally in 4:4:4 format have quite different statistics compared to natural video sequences. In video coding, performance of conventional video coding tools, including HEVC, proves sometimes to be underwhelming when processing such "screen content" sequences.

The tools currently discussed on in HEVC SCC to process "screen content" video sequences include the Intra Block Copy mode and the Palette mode. Prototypes for these modes have shown good coding efficiency compared to the conventional method targeting natural video sequences. Focus is made in this document on the Palette coding mode.

An implementation of the palette mode of HEVC SCC is based on prediction. It can be indifferently applied to any other lossless or lossy coding methods. It means that the Palette method is used to build a predictor for the coding of a given coding unit similarly to a prediction performed by motion prediction (Inter case) or by an Intra prediction. After the generation of the predictor, a residual coding unit is transformed, quantized and coded. In other words, the same processes as described above with reference to FIGS. 1 and 2 apply.

In another implementation described below with reference to FIG. 7, the block built with the Palette mode is directly encoded in the bitstream without containing any residual.

Figure 8:
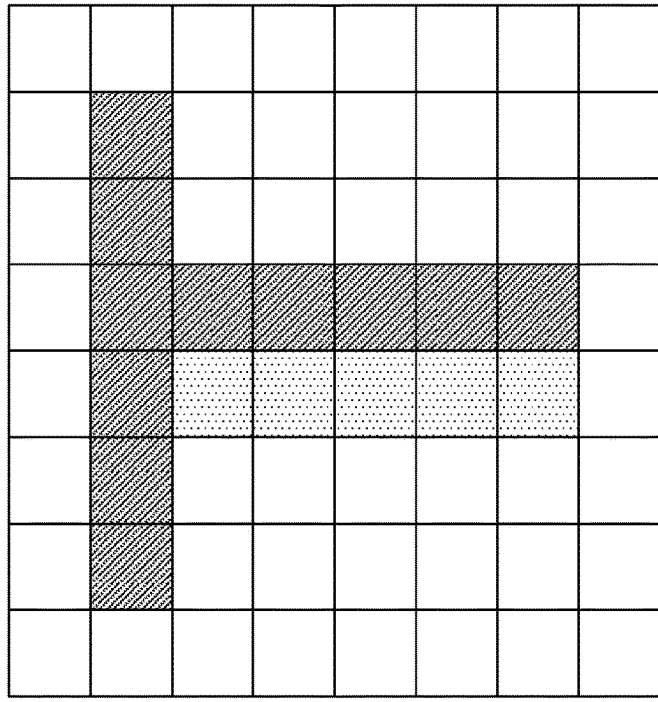
FIG. 8 illustrates an example of coding unit with its corresponding block of levels and the associated palette.

A palette is generally represented by a table containing a finite set of N-tuple of colours, each colour being defined by its components in a given colour space (see for example 803 in FIG. 8 based on YUV colour space). For example, in a typical 4:4:4 RGB format, the palette is composed of a list of P elements of N-tuple (where N=3 for a RGB). More precisely, each element corresponds to a fixed triplet of colour components in the RGB format. Of course this is not limited to a RGB or YUV colour format. Any other colour format can be represented by a palette and can use a smaller or a higher number of colour components, meaning that N may be different from 3.

At the encoder side, the Palette mode, under consideration in SCC, consists in transforming pixel values of a given input coding unit into indexes called levels identifying the entries in an associated palette. After the transformation, the resulting coding unit or block of indexes is composed of levels and is then transmitted to the decoder with the associated palette, generally a table having a finite number of triplets of colours used to represent the coding unit. Since the palette defines a finite number of colours, the transformation into a block of indexes usually approximates the original input coding unit.

To apply the Palette mode at the encoder side, an exemplary way to transform a coding unit of pixels is performed as follows:

find the P triplets describing at best the coding unit of pixels to encode, for example by minimizing overall distortion;

then associate with each pixel of the coding unit the closest colour among the P triplets: the value to encode (or level) is then the index corresponding to the entry of the associated closest colour.

additionally, it may be worth not using the palette if the pixel value currently processed is far from any entry of the palette. In such situation, SCC provides escape-coding of the pixel, meaning explicit encoding of its the pixel value (escape coded pixel) in the bitstream after applying a quantization step.

For each coding unit, the palette (i.e. the P triplets found), the block of indexes or levels, the escape coded pixels (stored in a block of "escaped pixels") and optionally the residual representing the difference between the original coding unit and the block of indexes in the colour space (which is the block predictor) are coded in the bitstream 110 and sent to the decoder.

At the decoder, the Palette mode consists in operating the conversion in the reverse way. It means that each decoded index associated with each pixel of the coding unit is replaced by the corresponding colour of the palette or by the escaped pixel values (depending on whether the escape coding has been applied or not) decoded from the bitstream, in order to generate the corresponding colour for each pixel of the coding unit. This is the building of the block of indexes in the colour space at the decoder.

Figure 6:
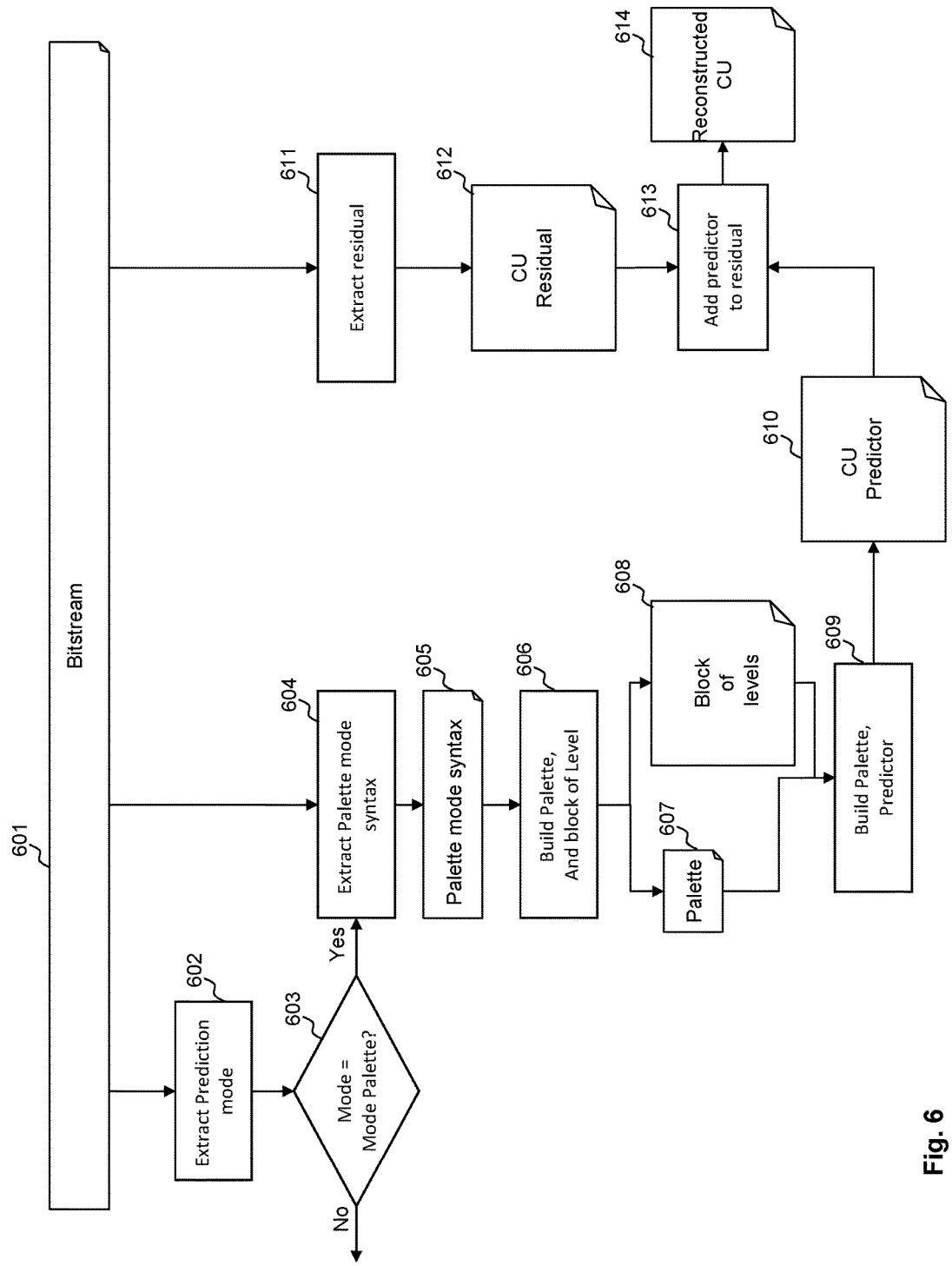
FIG. 6 illustrates the principle of Palette coding mode at the decoder side under investigation in the Screen content Coding extension of HEVC.

FIG. 6 further illustrates the principle of the first implementation of the Palette coding mode at the decoder. The coding mode for the current coding unit is extracted at step 602 from the bitstream 601. Currently, the Palette mode is identified by a flag located before the skip flag in the bitstream (the other coding modes have been described above with reference to FIGS. 1 and 2). This flag is CABAC coded using a single context. If this mode is the Palette mode 603 then the related syntax of the Palette mode 605, i.e. the information on the palette, the block of levels, the block of escaped pixels and optionally the residual, is extracted and decoded 604 from the bitstream 601.

Then, during step 606, two elements are built from the decoded data: the palette 607 and the block of levels 608. From this block of levels and the associated palette, the coding unit predictor in pixel domain 610 is built 609. It means that for each level of the block of levels, a colour (RGB or YUV) is associated with each pixel.

Then the coding unit residual is decoded 611 from the bitstream 601. In the current implementation of the Palette mode, the residual associated with a Palette mode is coded using the common HEVC Inter residual coding method, i.e. using Golomb coding. To obtain the residual 612 of the coding unit, the conventional inverse quantization and inverse transformation are performed. The block predictor 610 is added 613 to this coding unit residual 612 in order to form the reconstructed coding unit 614.

An HEVC SCC variant of the palette mode prediction of FIG. 6 is now described with reference to FIG. 7, where 701 to 708 are mostly similar to 601 to 608.

In this variant, there is no residual and no prediction per se, meaning that the only pixels that can be properly represented by the palette are coded using a corresponding entry of the palette mode.

In this particular context, the pixels that cannot be properly represented by the palette are coded differently, without reference to a colour entry of the palette. Instead of using an entry of the palette, the quantized pixel value is explicitly transmitted. Such pixels are known as "escaped values" or "escape-coded pixels" as mentioned above. This escape mode provides an efficient way to handle very infrequent pixels without using any palette entry to signal it and thus wasting a palette entry (the palette may be limited in size).

When a pixel is coded as an escaped value, an escape flag as described below is set to a predetermined value, to make it possible for the decoder to identify which pixels of the Coding Unit are escape-coded and which pixels of the same Coding Unit are coded using a palette entry.

An example of signalling the pixels is to add an "escape" flag before the "Pred mode" element, indicating whether a pixel is palette-coded (coded using a level from a palette entry) or escape-coded (therefore with an explicit pixel value). The "escape" flag is followed by the explicit pixel value (no "Pred mode", "Level" and "Run" elements are provided for this pixel).

In a variant, the "escape" information may use a specific Level value (dedicated to "escape-coded" pixels) in the block of indexes to signal which pixel is an "escape-coded" pixel.

In any embodiment, the explicit pixel values may be coded predictively (e.g. as a difference to a neighbour pixel value) or not, using variable length coding or not, and may be quantized or not, with possible consequences for the entropy coding (contextual and number of bits, etc.).

Compared to FIG. 6, a few steps are modified.

Because the syntax is slightly changed since no residual is encoded, step 704 extracts a different specific syntax 705 compared to 605. This is because, in the palette mode of FIG. 7, pixel values are coded using the Palette mode only if they are properly represented by a palette entry. Otherwise, i.e. if the pixel value cannot be coded using the Palette mode (for instance because it cannot be properly represented by a palette entry or the palette has reached its maximum size and no new value can be added), the pixel value is coded as an escaped value.

At step 706, similarly to step 606 in FIG. 6, three elements are built from the decoded data: the palette 707, the block of levels 708 and a block of escaped pixel values. Based on all these data, the decoder is able to generate 709 the current Coding Unit 714, in particular by regenerating the pixel values of the Coding Unit using the palette for the non-escaped pixels and decoding the escaped pixel values from the encoded explicit pixel value.

FIG. 8 illustrates the principle of the Palette mode at the encoder. The current coding unit 801 is converted into a block 802 of the same size which contains a level for each pixel instead of 3 colour values (Y, U, V) or (R, G, B). The palette 803 associated with this block of levels is built based on coding unit overall distortion minimization and associates, with each entry, an entry index or level having corresponding pixel colour values. Note that for monochrome application, the pixel value can contain only one component.

Figure 7:
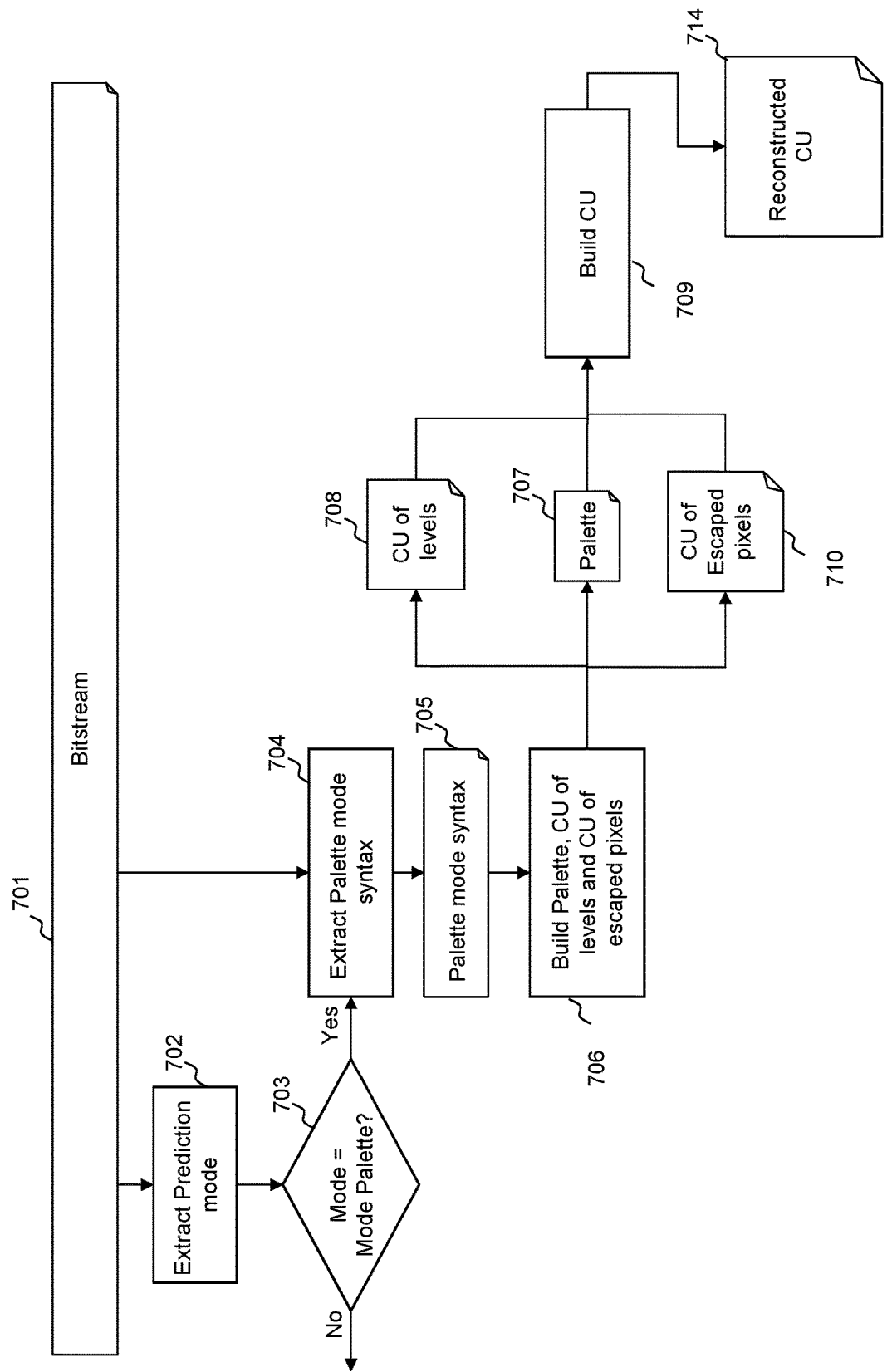
FIG. 7 illustrates a variant of the Palette coding mode at the decoder side, involving no residual.

As mentioned in relation to FIGS. 6 and 7, the palette (as well as the residual for FIG. 6 only) is coded and inserted in the bitstream for each coding unit. In the same way, the block of levels or indexes is coded and inserted in the bitstream and an example of the coding thereof is given below with reference to FIG. 9. In this example, the block of levels is processed in a raster scan order.

The block of levels 91 is exactly the same as the one illustrated in FIG. 8 under reference 802. The tables 92 and 93 describe the successive syntax elements used to code the block of levels 91. Table 93 should be read as the continuation of table 92. The syntax elements in the table correspond to the encoding of the groups of levels surrounded by bold lines in the block 91.

The block of levels is encoded by group of successive pixels in raster scan order. Each group is encoded using a first syntax element giving a prediction direction (i.e. the prediction or reconstruction mode used to reconstruct the indexes of the groups), an optional second syntax element giving the value of the pixel or pixels, namely the level, a third syntax element giving the repetition. The repetition corresponds to the number of pixels in the group.

These two tables depict the current syntax associated with the Palette mode. These syntax elements correspond to the encoded information associated in the bitstream with the block of levels 91. In these tables, three main syntax elements are used to fully represent the operations of the Palette mode and are used as follows when successively considering the levels of the block of levels 91.

A first syntax element, called "Pred mode" allows the two encoding modes to be distinguished. In a first mode corresponding to "Pred mode" flag equal to "0", a new level is used for the current pixel. The level is immediately signalled after this flag in the bitstream. In a second mode corresponding to "Pred mode" flag equal to "1", a "copy up" mode is used. More specifically, this means that the current pixel level corresponds to the pixel level located at the line immediately above starting on the same position for a raster scan order. In that case of "Pred mode" flag equal to "1", there is no need to signal a level immediately after the flag because the value of the level is known by reference to the value of the level of the pixel just above in the block of levels 91.

A second syntax element called "Level" indicates the level value of the palette for the current pixel only in the first mode of "Pred mode".

A third syntax element, called "Run", is used to encode a repetition value in both modes of "Pred mode". Considering that the block of levels 91 is scanned from the top left corner to the bottom right corner, row by row from left to right and top to bottom, the Run syntax element gives the number of successive pixels in block 91 having the same encoding, i.e. the number of indexes in the group of indexes to which the current syntax elements apply.

This "Run" syntax element has a different meaning which depends on the "pred mode" flag. When Pred mode is 0, "Run" element is the number of successive pixels of the block having the same level value. For example, if Run=8 this means that the current "Level" is applied to the current pixel and to the following 8 pixels which corresponds to 9 identical successive samples in raster scan order.

When Pred mode is 1, "Run" element is the number of successive pixels of the block having a level value corresponding to the level value of their above pixel in block 91, i.e. where the "copy up" mode is applied. For example, if Run=31 this means that the level of the current pixel is copied from the pixel of the line above as well as the following 31 pixels which corresponds to 32 pixels in total.

Regarding tables 92 and 93, they represent the eight steps to code the block 91 using the Palette mode. Each step starts with the coding of the "Pred mode" flag which is followed by the "Level" syntax element when "Pred mode" flag equals "0", or by the "Run" syntax element when "Pred mode" flag equals "1". The "Level" syntax element is always followed by a "Run" syntax element.

When the coding mode decoded for the current block is the palette mode, the decoder first decodes the syntax related to this block and then applied the reconstruction process for the coding unit.

Figure 10:
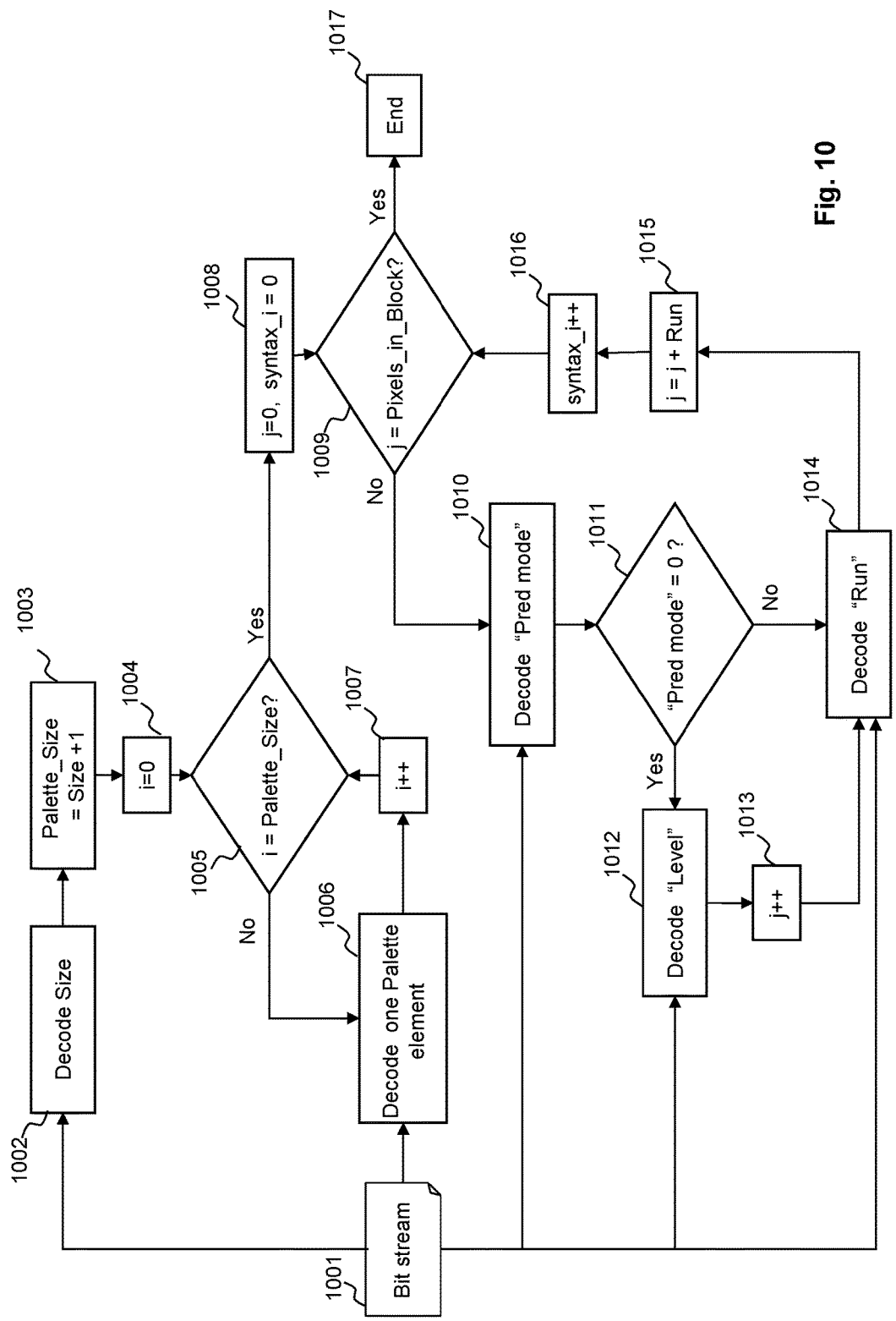
FIG. 10 illustrates a decoding process of the syntax elements related to the Palette mode.

FIG. 10 illustrates the decoding process of the syntax elements related to the Palette mode (steps 605-606 or 705-706 above). First, the size of the palette is extracted and decoded 1002 from the bitstream 1001. The exact size of the palette (Palette_size) is obtained by adding 1 to this size value decoded at step 1002. Indeed, the size is coded by using a unary code for which the value 0 has the smallest number of bits (1 bit) and the size of the palette cannot be equal to 0, otherwise no pixel value can be used to build the block predictor.

Then the process corresponding to the palette values decoding starts. A variable i corresponding to the index of the palette is set equal to 0 at step 1004 next a test is performed at step 1005 to check if i is equal to the palette size (Palette_size). If it is not the case, one palette element is extracted from the bitstream 1001 and decoded 1006 and is then added to the palette with the associated level/index equal to i. Then the variable i is incremented through step 1007. If i is equal to the palette size 1005, the palette has been completely decoded.

Next the process corresponding to the decoding of the block of levels 91 is performed. First, the variable j, corresponding to a pixel counter, is set to 0 as well as the variable syntax_i 1008. Then a check is performed to know if the pixel counter corresponds to the number of pixels contained in the block (known since the breakdown of the Coding Tree Block into Coding Units is known by the decoder—see FIG. 5). If the answer is yes at step 1009 the process ends at step 1017, otherwise the value of the flag "Pred mode" corresponding to one prediction mode is extracted from the bitstream 1001 and decoded 1010.

The value of "Pred mode" is added to a table at the index syntax_i containing all "Pred mode" values decoded. If the value of this "Pred mode" is equal to 0, the syntax element corresponding to "Level" is extracted, at step 1011, from the bitstream 1001 and decoded 1012. This variable "Level" is added to a table at the index syntax_i containing all levels decoded. The variable j corresponding to the pixel counter is incremented by one 1013.

Next the "Run" syntax element is decoded at step 1014. If the syntax element "Pred Mode" is equal to 1, step 1011, the "Run" value is also decoded at step 1014. This syntax element "Run" is added to a table at the index syntax_i containing all the runs decoded.

Next at step 1015, the value j is incremented by the value of the Run decoded at step 1014. The variable syntax_i is incremented by one to consider the next set of syntax elements. If the counter j is equal to the number of pixels in the block (i.e. the last set of syntax elements for the current Coding Unit has been processed) then the syntax to build the block of levels 91 is finished 1017. At the end of this process related to the Palette, the decoder knows the palette, and the tables containing the list of all the "Pred mode", "Level" and "Run" syntax elements associated with the Palette mode of this coding unit. The decoder can then proceed with the reconstruction process of the coding unit as described through FIG. 6 or 7.

It is reminded here that a specific index value in the block of indexes (which index correspond to a palette entry having no pixel value associated with it) may be used to flag the escape-coded pixels and the explicit escape-coded values are extracted from the bitstream.

For illustrative purposes only, codewords that may be associated with each syntax element are given below. Of course, other codewords may be used to obtain better coding efficiency Each palette element, constituted by three values (YUV or RGB) in the above examples, is generally encoded using three binary codes (decoded at step 1016). The length of the binary codes corresponds to the bit-depth of each colour component (8 bits to represent 256 values).

The palette size decoded at step 1002 is typically encoded using unary code.

The "Pred mode" element is encoded using one bit.

The "Level" element is encoded using a binary code or a truncated binary code.

In embodiments of the invention, the "Run" element is encoded using variable length codes. For instance, some values for the Run element are coded using short codewords and other values are coded using other codewords made of a common codeword prefix and of a codeword suffix that differs from one other codeword to the other.

The table below gives an example of codewords for the Run element.

| "Run" values | Codeword |
| --- | --- |
| 0 | '0' |
| 1 | '10' |
| 2 | '110' |
| >2 | Prefix = '111' and Suffix = Truncated Rice code, cRiceParam = 3 |

Figure 15:
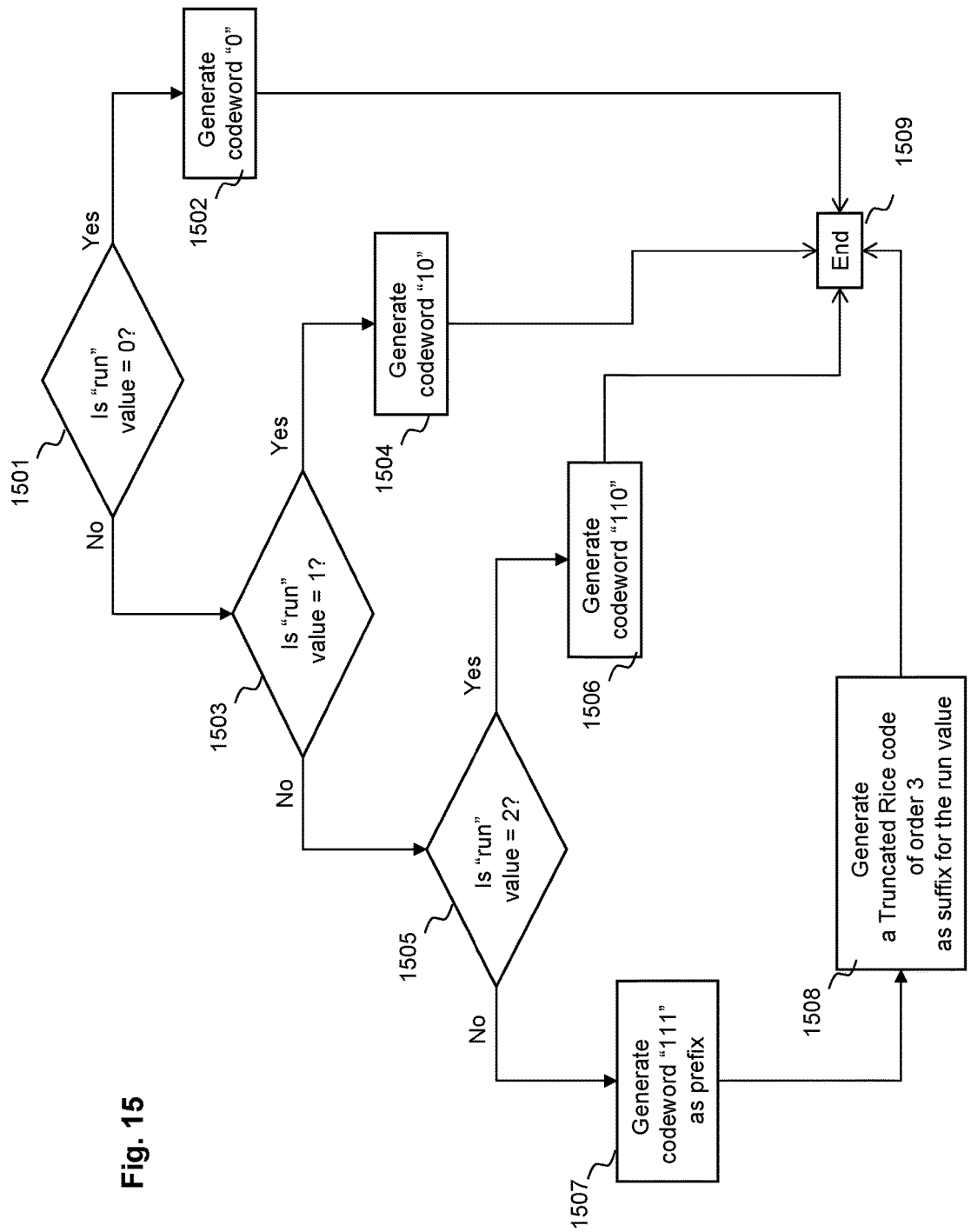
FIG. 15 illustrates an algorithm to encode the "Run" syntax element.

FIG. 15 illustrates an algorithm to encode the "Run" element according to this table, in which a codeword used to encode a "Run" value depends on said value.

In this example, the three first possible values for the Run element, i.e. 0, 1 and 2, are coded using short codewords (of course more or less first possible values may be concerned by short coding values), and the other (and subsequent) possible values for the Run element are coded using other codewords made of a common codeword prefix and of a codeword suffix that differs from one other possible codeword to the other.

This design of the codewords gives priority to the three first values (0, 1 and 2) for the Run element which are usually very frequent in the palette mode. As a consequence, the other and high values for the Run element use quite long codewords.

As shown in the Figure, a first check is performed at step 1501 where the value is compared to 0. If the value is equal to 0 a codeword "0" is generated at step 1502 and the coding of the current Run element ends at step 1509.

If the answer at step 1501 is negative, a second test is performed at step 1503 to know if the Run value is equal to 1. If the response is positive, a codeword "10" is generated at step 1504 and the next step is 1509.

If the Run value is not equal to 1, a further test is performed at step 1505 where the Run value is compared to 2. If the Run value is equal to 2, the codeword "110" is generated at step 1506 and the next step is 1509.

If the response at step 1505 is negative, a prefix code "111" is generated, and the value of the Run value is coded using a truncated Rice code of order 3 (where the symbol to code is the value of the Run element minus 3) at step 1508. Step 1508 is then followed by step 1509 which completes the coding of the Run value.

It may be noted that the codewords (either short codewords "0", "10", "110" and prefix+suffix codewords "111x . . . x") can be directly inserted into the bitstream or can be coded by using an arithmetic entropy coder like CABAC to reduce the final size of the information relative to the coding of the Run values.

Figure 16:
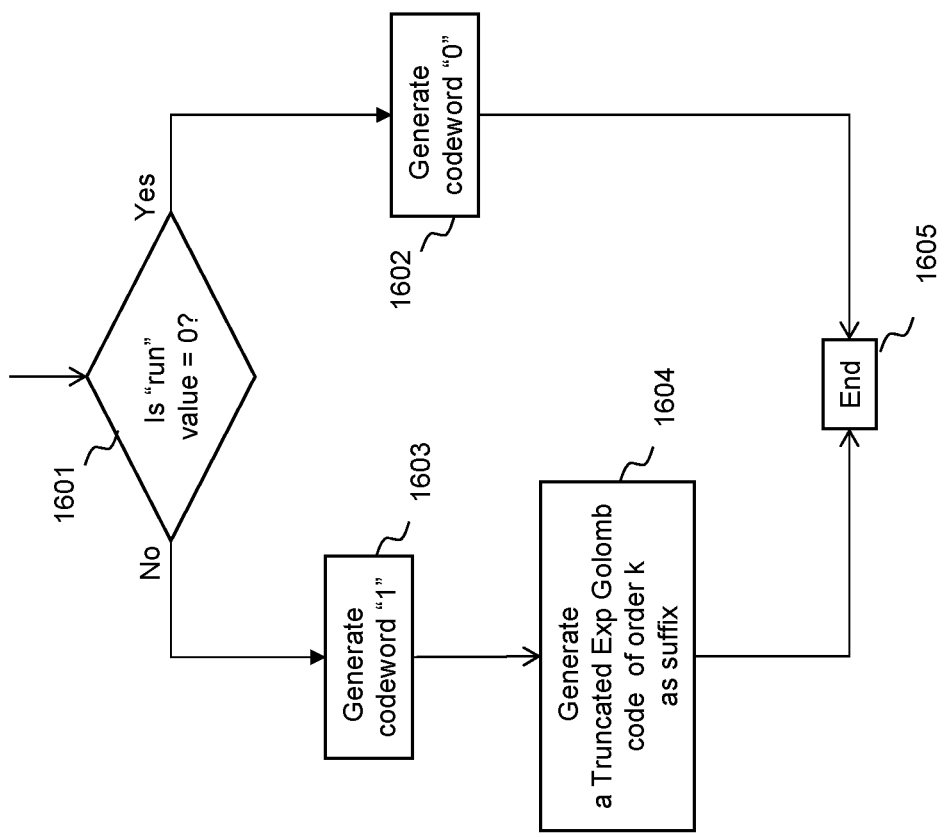
FIG. 16 illustrates another algorithm to encode the "Run" element.

FIG. 16 illustrates another algorithm to encode the "Run" element which provides a short codeword only for the Run value "0", and thus includes less steps than FIG. 15.

The process starts at step 1601 during which the Run value is compared to 0. If the answer is positive, a codeword "0" is generated at step 1602 and the coding of the current Run element ends at step 1605.

If the answer at step 1601 is negative (the Run value is different form 0), a codeword of "1" is generated at step 1603 to form a prefix code "1" common to all the Run values different from "0". Next, the Run value is coded, at step 1604, using a k-th order Truncated Exp-Golomb code where the symbol to code is the value of the Run element minus 1 and the order k is computed by taking account the size of the Coding Unit and the current scanning position of the current Run element. Next, the coding of the current Run element ends at step 1605.

Figure 11:
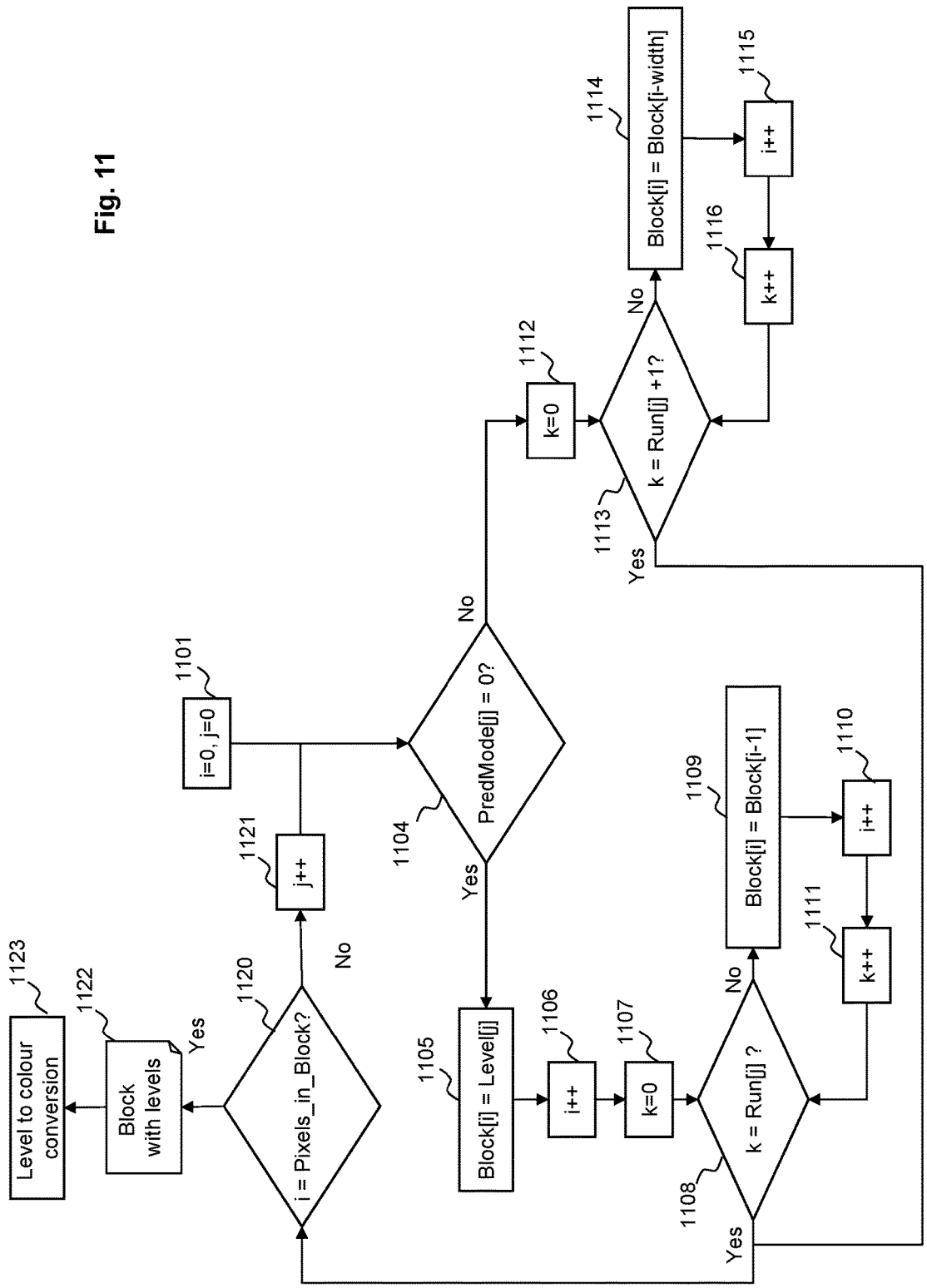
FIG. 11 illustrates a reconstruction process to build the block of levels at the decoding side.

FIG. 11 illustrates the reconstruction process to build the block of levels 91 and then the corresponding block in the colour space (that is to be used as a predictor for the first implementation of the Palette mode or that is the decoded current Coding unit for the other implementation of the Palette mode). The input data of this process are the tables obtained in the process of FIG. 10 above, and containing the list of "Pred mode", "Level" and "Run". An additional input data is the size of the coding unit 801 (which is the same as the size of the block of levels 802/91) known from the quadtree (FIG. 5) signalled in the bitstream.

In a first step 1101, a variable i, representing a pixel counter, is set equal to 0 and a variable j, to successively consider each set of syntax elements, is also set equal to 0. At step 1104, the element Pred_mode[j] extracted from the table of "Pred mode" at index j is checked against 0.

If it is equal to 0, a new level is encoded for the current pixel i. As a consequence, the value of the pixel at position i is set equal to the level at the index j from the table of levels; Block[i]=Level[j]. This is step 1105. The variable i is incremented by one at step 1106 to consider the next pixel, and the variable k, dedicated to count the pixels already processed in the current Run, is set equal to 0 at step 1107.

A check is performed at step 1108 to determine whether or not k is equal to the "Run" element of the table of runs at the index j: k=Run[j] ?. If not equal, the level of the pixel at position i is set equal to the level value of the pixel at position i−1: Block[i]=Block[i−1]. This is step 1109. The variable i and the variable k are then incremented by one at respectively steps 1110 and 1111. If k=Run[j] at step 1108, the propagation of the left level value is finished and step 1120 is performed (described below).

If Pred_mode[j] is different from 0 at step 1104, the "copy up" mode starts with the variable k set equal to 0 at step 1112. Next, step 1113 checks whether or not (k−1) is equal to the "Run" element of the table of runs at the index j: k=Run[j]+1? If not equal, the level value of the pixel at position i is set equal to the level value of the pixel at position i of the above line: Block[i]=Block[i-width], where "width" is the width of the block of levels (the same as the coding unit) as deduced from the input size of the coding unit. This is step 1114. Next, the variable i and the variable k are each incremented by one at respectively steps 1115 and 1116. If k=Run[j]+1 at step 1113, the prediction mode 'copy up' is completed and the process goes on at step 1120.

At step 1120, a check is performed to determine whether or not the variable i is equal to the amount of pixels in the block 91/CU 801. If not equal, the variable j is incremented by one at step 1121 to consider the next set of syntax elements and the process loops back to step 1104 described above.

If all the pixels have been processed at step 1120, the final block of levels 91 is obtained at step 1122: this corresponds to table Block[ ]. Then a final step 1123 (corresponding to step 709 for instance) consists in converting each level in colour values using the palette 803 decoded using the process of FIG. 10. This final step affects pixel values (Y, U, V) or (R, G, B) at each block position according to the level of this position in the block and the corresponding entries in the palette.

Note that this is during step 1123 that the escaped pixels are converted into their exact pixel values. The escape mode may be signalled using a particular value of the level table. For example, if the palette contains 32 elements, the last value (31) may be used to signal the escape mode and no palette entry is associated with this specific value, meaning that an escape pixel is defined in the block of levels, using a value (the last value) that is not associated with a pixel value in the palette.

Thus, to identify the escaped pixels, step 1123 compares Block[j] with the specific value assigned to signal the escaped pixels. For each of these escaped pixels, step 1123 retrieves the corresponding exact pixel value from the Coding Unit of escaped pixels 710.

In embodiments, the escape mode may be signalled using the specific level value, which value is followed by the three colour component values defining the exact value of the pixel.

In addition, if the escaped pixels are quantized at the encoder, the de-quantization step is performed at step 1123.

Other aspects of the palette mode as introduced in HEVC SCC regard the determination by the encoder of the palette to be used to encode the current coding unit (see FIG. 12 below), and the selection of the Pred mode, Level and Run syntax elements at the encoder (see FIG. 13 below).

Figure 12:
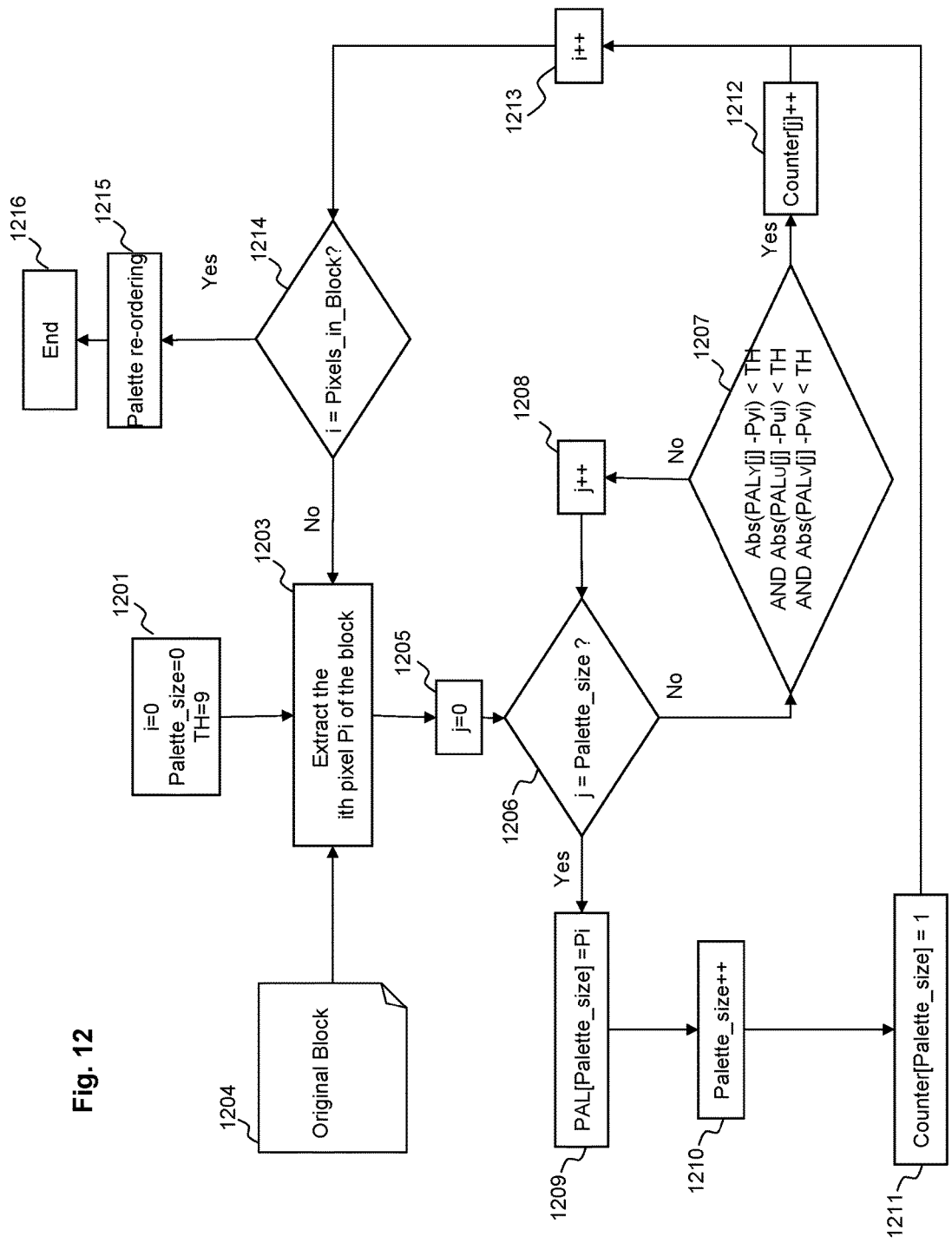
FIG. 12 illustrates an exemplary palette determination algorithm at the encoder.

FIG. 12 illustrates an exemplary palette determination algorithm at the encoder. The input data of this process are the original coding unit of pixels and its coding unit size. In this example, a YUV palette is built, but other implementations may result in having a RGB palette built in the same way.

At a first step 1201, a variable j representing a pixel counter is set to 0, a variable "Palette_size" to follow the growth of the palette as it is being built is also set to 0, and a variable "TH" representative of a threshold is defined, e.g. set to 9 for lossy coding, or 0 in case of lossless coding. Indeed, in lossless coding, quantization is skipped entirely and QP is artificially set to e.g. 0. This lossless property may be defined at the CU level (syntax element cu_transquant_bypass_flag is present and set to 1 if the syntax element transquant_bypass_enabled_flag at Picture Parameter Set-level (PPS-level) is set to 1).

In any case, it is reminded that if the coding unit CU is losslessly coded, then the error limit is set to 0, as the goal here is to guarantee that a level represents a pixel without any mismatch. Then at step 1203, the pixel $p_i$, i.e. having the index i according to a scanning order, is read from the original coding unit 1204. Then the variable j is set equal to 0 at 1205 and at step 1206 a check is performed to determine whether or not the palette size is equal to the variable "j" (meaning that all the palette elements of the palette under construction have been considered).

If the palette size is equal to j, the palette at the index "j" is set equal to the pixel value $p_i$ at step 1209. This means that the current pixel $p_i$ becomes a new element in the palette, with index j associated with it. More precisely the following assignment is performed:

$$PAL_Y[j]=(Y_i)$$

$$PAL_U[j]=(U_i)$$

$$PAL_V[j]=(V_i)$$

where $PAL_{Y,U,V}$ are three tables to store the colour values.

The palette size (Palette_size) is incremented by one at step 1210 and an occurrence table Counter is set equal to 1 for the index 'Palette size' at step 1211. Then the variable i is incremented by one at step 1213 to consider the next pixel "i" of the current coding unit. A check is then performed at step 1214 to determine whether or not all the pixels of the current coding unit have been processed. If they have all been processed, the process is completed by an ordering step 1215 explained later on, otherwise the next pixel is considered at step 1203 described above.

The processing branch made of steps 1203 to 1206 and 1209 to 1211 iteratively considers each pixel of the block to add, to the palette, a new element having the value of the considered pixel each time the considered pixel is too far from all the element or elements already in the palette under construction (test 1207).

Back to step 1206, if j is different from palette_size, step 1207 is performed where the absolute value, for each colour component, of the difference between $p_i$, and the palette element at the index j is computed. The formulas are shown in the Figure. If all the absolute differences are strictly less than the predefined threshold TH, the occurrence counter regarding the element "j" in the palette is incremented by one at step 1212. Step 1207 creates a class for each element of the palette under construction, such a class encompassing colours neighbouring the colour of the element, given the margin TH. Thus step 1212 counts the occurrences of each class. Step 1212 is followed by step 1213 already described.

The processing branch made of steps 1203 to 1207 and 1212 iteratively considers each pixel of the block to increment a counter associated with a palette element that is close enough to the considered pixel.

If the condition of step 1207 is not met, the variable j is incremented by one at step 1208 to consider the next palette element in the palette under construction. This is to compare the other palette colour elements to the current pixel through new occurrence of step 1207. If no element in the palette meets the criterion of step 1207, a new element is added to the palette as described above with reference to steps 1209, 1210 and 1211.

One may note that the decision module 1207 can compare each colour component for a 4:4:4 (YUV or RGB) sequences and can only compare either the Luma colour component or the chroma colour Components for 4:2:0 sequences.

At the end of the process of FIG. 12, the table "Counter" contains the number of occurrences of the classes defined by the respective palette elements. Then the palette elements are ordered at step 1215 according to their occurrences so that the most frequent element is in the first position (entry with the lowest index or "level") in the palette.

One may also note that the size of the palette can be limited to a maximum size, for example 24 entries. In such a case, if the size of the palette resulting from step 1215 exceeds 24, the palette is reduced by removing the elements (entries) from the 25$^{th}$ position in the ordered palette. It results that a palette has been built.

Figure 13:
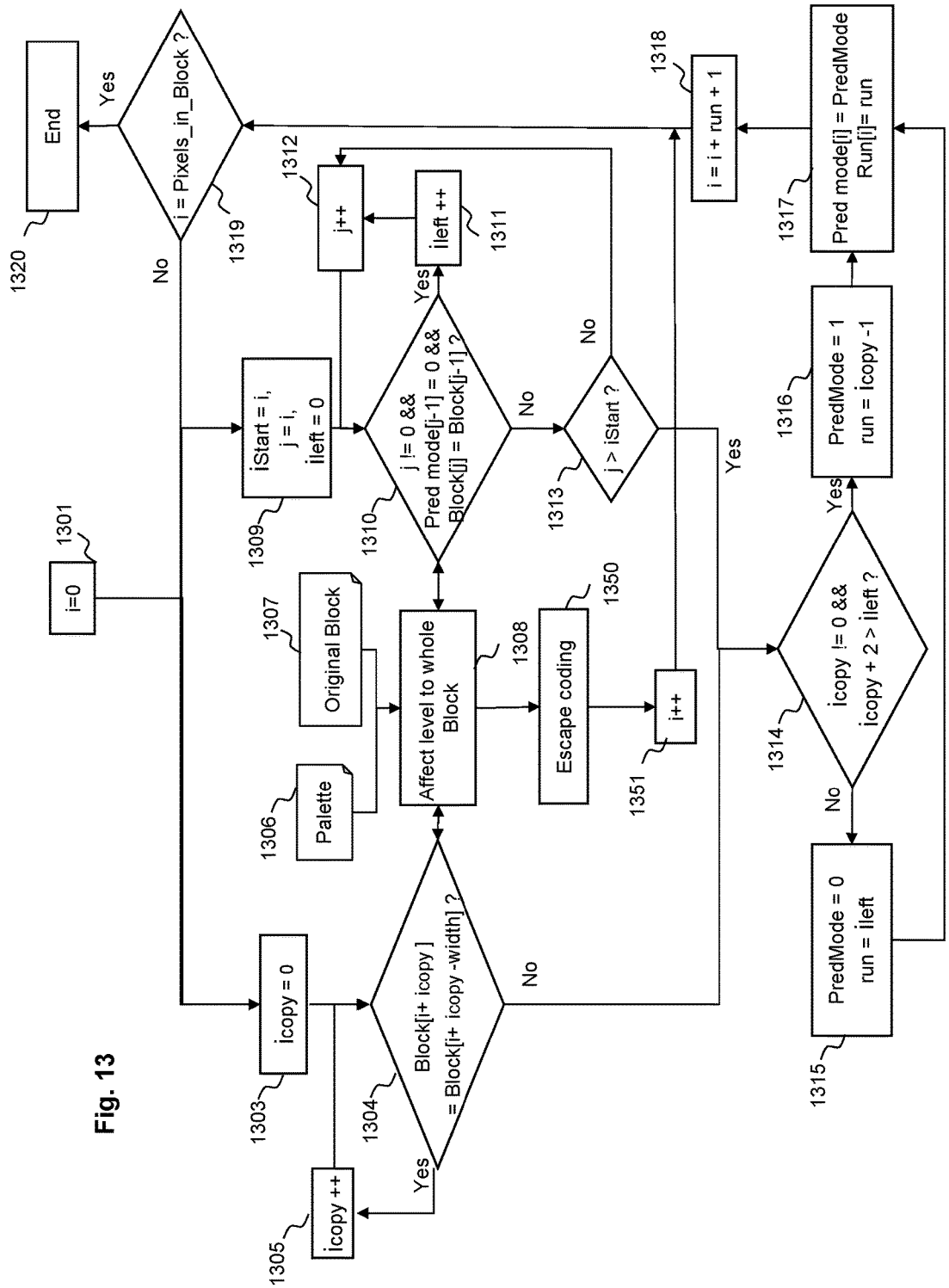
FIG. 13 illustrates a selection of the Pred mode, Level and Run syntax elements as well as the escape coding mode, at the encoder for the Palette mode.

Turning now to the selection of the Pred mode, Level and Run syntax elements at the encoder, input data of the process of FIG. 13 are the original coding unit of pixels, the palette as built through the process of FIG. 12 and the coding unit size. In particular, this evaluation is performed when determining which coding mode between INTRA coding, INTER coding and Palette coding has to be used.

At a first step 1301, the variable "i" representing a pixel counter is set to 0. The process described below seeks to determine the syntax elements for the pixels starting from i. The two modes of prediction are evaluated independently: "Pred mode"=0 on the right hand part of the Figure, and "Pred mode"=1 on the left hand part of the Figure.

However, if these prediction modes fail, an escape mode as introduced above is used to explicitly encode one or several pixel values.

For the 'copy up' prediction (corresponding to "Pred mode"=1), the variable "$i_{copy}$" used to count the number of levels in the current Run is set equal to 0 at step 1303. Then at step 1304 the current level at pixel location i+$i_{copy}$: Block[i+$i_{copy}$], is compared to the level of the pixel located just above in the above line: Block[i+$i_{copy}$−width], where "width" corresponds to the width of the current coding unit.

Note that the level Block[i+$i_{copy}$] of each pixel of the coding unit is determined in parallel at step 1308. This step consists in associating with the pixel at the position i+$i_{copy}$, the closest palette element (in practice its index or level) as already explained above. In a variant, this step may consist in selecting the first palette element for which a distance with the pixel at position i is below a predefined threshold. This step uses the position i, the palette 1306 and the original coding unit 1307.

However if the current pixel value is "far" from any entry of the palette, the step 1350 is performed to signal that the escape mode is activated for this pixel. The escape mode is used when, for example, the difference between a color component value of a pixel and the closest entry in the palette exceeds a given threshold. Next to step 1350, the pixel counter i is incremented by one at step 1351 before looping to step 1319.

In a slight variant, step 1350 is internal to step 1308 to assign the above-defined specific level value to the escaped pixel, and step 1351 is deleted. This approach makes it possible to use the "copy up" and "left value" prediction modes to efficiently encode the occurrences of the specific value used to signal the escaped pixels.

If Block[i+$i_{copy}$]=Block[i+$i_{copy}$−width] at step 1304, the variable "$i_{copy}$" is incremented by one at step 1305 to consider the next pixel value of the block of pixels and to indicate that the current pixel level at position i+$i_{copy}$ can be included in the current "copy up" Run. If Block[i+$i_{copy}$] is different from Block[i+$i_{copy}$−width] at step 1304 meaning that the current evaluation of a "copy up" Run has ended, the variable "$i_{copy}$" is transmitted to the decision module 1314. At this stage of the process, the variable "$i_{copy}$" corresponds to the number of values copied from the line just above.

For the left value prediction (corresponding to "Pred mode"=0), the loop to determine the Run value ($i_{left}$) is processed in parallel or sequentially. First the variable "$i_{Start}$" used to store the index i of the current pixel is set to "i", and the variable "j" used to consider successively the pixel levels following index "i" is also set equal to "i" and the variable "$_{left}$" used to count the current Run under construction is set equal to 0. This is step 1309. Next, step 1310 consists to determine whether or not j !=0 and "Pred_mode[j−1]"=0 and Block[j]=Block[j−1]. Pred_mode[ ] is a table used by the encoder to store the prediction mode (either 1 or 0 for respectively the "copy up" prediction and the left value prediction). It is filled up progressively at step 1317 described below as the successive pixels are processed, and has been initialized with zero values for example at step 1301: Pred_mode[k]=0 for any k.

If the condition at step 1310 is met, the variable "$_{left}$" is incremented by one at step 1311 to indicate that the current pixel level at position j can be included in the current "left value" Run, and the variable j is incremented by one at step 1312 to consider the next pixel value of the block of pixels.

If the condition at step 1310 is not met, the variable "j" is compared to "$i_{start}$" to determine if it is the first pixel value to be examined for the current "left value" Run. This is step 1313. If "j" is equal to or less than "$i_{start}$", meaning that it is the first pixel value to be examined for the current Run, then it starts the current Run and the next pixel value is considered at step 1312 described above. If "j" is strictly higher than "$i_{start}$", meaning that a first pixel value different from the pixel value of the current "left value" Run has been detected, the variable "$_{left}$" which corresponds to the length of the current "left value" Run is transmitted to the decision module 1314. Note that, as the loop for "copy up" prediction, the level Block[i] at the index i is determined in the same loop at step 1308.

After having computed the maximum run for the 'left value prediction' and the 'copy up' mode, the variable "$_{left}$" and "$i_{copy}$" are compared at step 1314. This is to determine whether or not "$i_{copy}$" !=0 and "$i_{copy}$"+2 is higher than "$i_{left}$". This is an exemplary criterion to select either the copy up mode or the left value prediction mode. In particular, the parameter "2" used to compensate the rate cost of the level of the left value prediction mode may be slightly changed. In particular, the additive parameter (2 in this example) may be made dependent on the size of the palette (Palette_size) because the latter is directly related to the cost of the level. In one embodiment, the operation "+2" is removed in order that comparison of step 1314 checks: "icopy !=0 && icopy>ileft". This embodiment improves coding efficiency.

The condition at step 1314 means that if "$i_{copy}$" is equal to 0 or is smaller than or equal to $i_{left}$−2, the "left value prediction" mode is selected at step 1315. In that case, a "PredMode" variable is set equal to 0 and a Run variable is set equal to "$_{left}$" at same step 1315. On the other hand, if "$i_{copy}$" is different from 0 and is strictly higher than "$i_{left}$−2", the "copy-up" mode is selected at step 1316. In that case, the "PredMode" variable is set equal to 1 and the Run variable to $i_{copy}$−1 at step 1316.

Then the tables containing the "Pred_mode" and the "Run" at the encoder are updated with the current value "Pred_mode" and "Run", at step 1317. Then, the next position to consider in the block of pixels is computed at step 1318, which corresponds to the current position i incremented by the "run" value+1. Then a check is performed at step 1319 to determine whether the last pixels of the coding unit have been processed. If it is the case, the process ends at step 1320, otherwise the evaluation of the two prediction modes "left prediction" and "copy up" are evaluated starting at steps 1303 and 1309 for the next pixel position to obtain a new set of syntax elements.

At the end of this process, the encoder knows the levels for each sample or pixel of the coding unit, and is able to encode the corresponding syntax of the block of levels based on the content of the three tables Pred_mode[ ], Block[ ] and Run[ ].

To determine the block predictor, the encoder then converts the defined block of levels using the palette and also uses the list of pixels that are signalled as escaped pixels at 1350.

Figure 17:
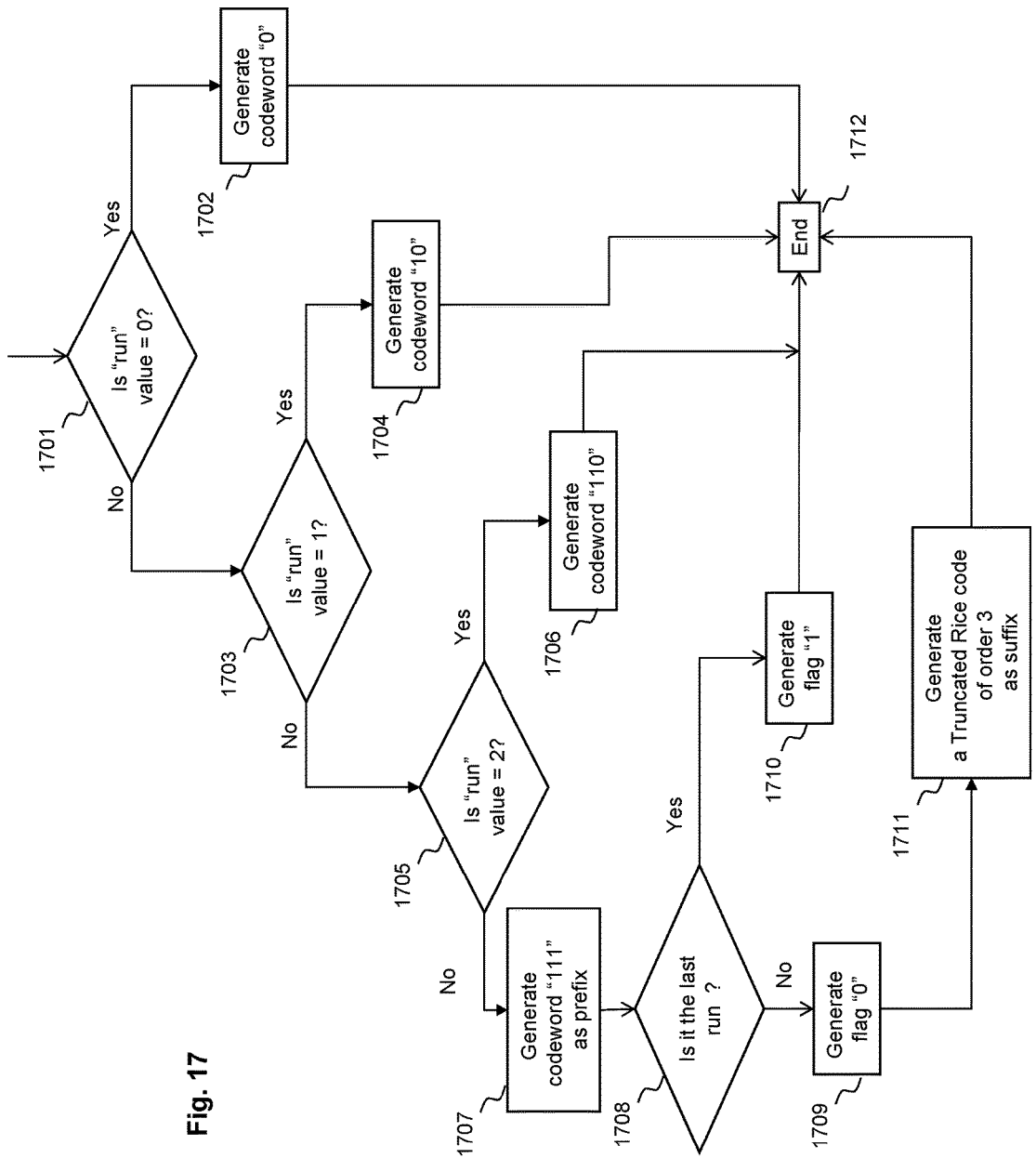
FIG. 17 illustrates an improved algorithm to encode the "Run" syntax element compared to FIG. 15.
Figure 18:
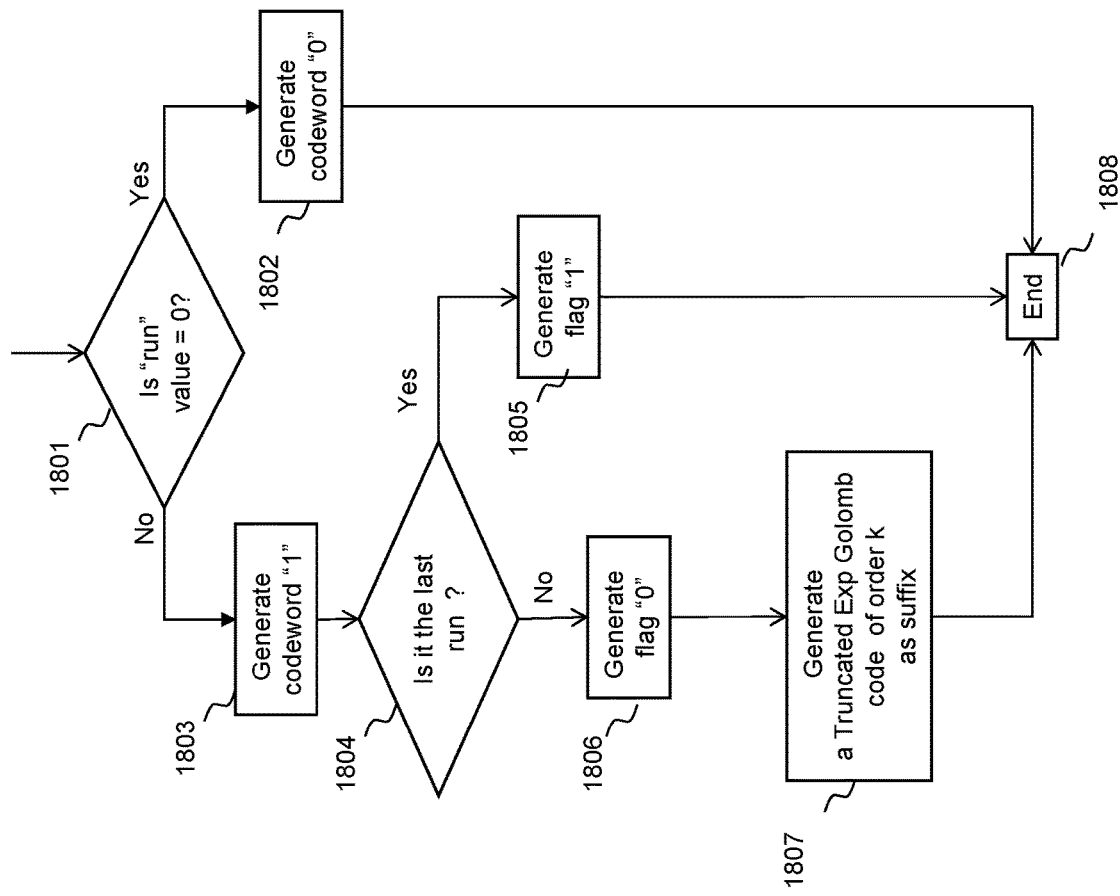
FIG. 18 illustrates an improved algorithm to encode the "Run" syntax element compared to FIG. 16.

FIGS. 17 and 18 illustrate exemplary algorithms at the encoder to encode the Run syntax element in the palette mode, with the same representation as in FIGS. 15 and 16 respectively. So the input data are the same.

In these examples of algorithm, a flag (for instance through an "up-to-end" codeword for the Run element) is used to indicate that a current "Run" is the last one and applies to all remaining indexes up to the end of the current Coding Unit regardless the number of such remaining indexes, i.e. without specifying the number of these remaining indexes forming the group of indexes corresponding to the current and last set of syntax elements. This approach makes it possible to save some bits compared to the situation where longer codewords are needed to encode the exact number of indexed for the last group (which is often large at least for the last Coding Units of an image because the bottom of an image is usually monotonous).

According to this approach, the Run syntax element provided in each set uses a codeword selected from at least two available codewords, including an up-to-end codeword to indicate that the indexes forming the corresponding group of indexes are the indexes at all remaining block positions up to the end of the block of indexes, regardless the number of such remaining block positions. The up-to-end codeword may thus be set for the Run element in the last set composing a Coding Unit. But this is not mandatory; conventional approach as described above may still be implemented for some Coding Units.

Note that an up-to-end binary flag separate from the conventional Run element may be provided to signal the up-to-end approach. However, such binary flag combined with any conventional codeword for the Run element form a codeword of an embedded Run element. This is why the present description concentrates on possible codewords for the Run element.

FIGS. 17 and 18 differ one the other by the codewords used to encode the Run values. As shown in these Figures, the Run syntax element in the last set for the current Coding Unit uses the up-to-end codeword to signal enabling the "up-to-end" option for the current set of syntax elements.

In the embodiment of FIG. 17, steps 1701 to 1707 are identical to the corresponding steps of FIG. 15 (steps 1501 to 1507) and thus are not described again.

Following the generation of the codeword "111" at step 1707 (at this position of the process, the Run value to be coded is superior to 2), step 1708 consists to determine whether or not the current Run is the last one for the current Coding Unit (i.e. whether or not the current set of syntax elements is the last one). The last Run means that no other operation ("copy up" or "left value") is going to be performed on the current Coding Unit after the coding of this last Run since the process reaches the very last pixel of the Coding Unit (in fact the very last index of the block of levels).

For instance, the last Run may be detected during the process of FIG. 13 when test 1319 is positive. In such a case, the last Run stored in memory at step 1317 is the last one for the current Coding Unit.

If the current Run is the last one, an idea of the present embodiment is to avoid signalling the value of the Run (which often is high, and thus could lead to a quite long codeword), by coding, at step 1710, a flag "1" in the bitstream to indicate that the last Run is being processed.

If the response is negative at step 1708, the next step is step 1709 where a flag "0" is coded in the bitstream saying that the current Run is not the last one. Next, the value of the Run minus 3 is coded at step 1711, similarly to step 1508.

In this configuration, the common codeword prefix used for the high values of the Run element ("111" resulting from step 1707 combined with step 1709) is used to form the up-to-end codeword. Next, the suffix part of the up-to-end codeword is reduced to a minimum, i.e. to a single bit (step 1710): the up-to-end codeword includes the common codeword prefix and includes a one-bit suffix in addition to the common codeword prefix.

Note that the "up-to-end" flag described in steps 1709 and 1710 can be also encoded by using an arithmetic entropy coder like CABAC to improve the coding efficiency of the method described by the invention.

In the embodiment of FIG. 18, the up-to-end codeword also includes a common codeword prefix used to encode the "other" Run values (i.e. those without a short codeword), and includes a one-bit suffix in addition to the common prefix binary value. Steps 1801 to 1803 are identical to the corresponding steps of FIG. 16 (steps 1601 to 1607) and thus are not described again.

Following the generation of the codeword "1" at step 1803 (meaning that the current Run value is different from 0), step 1804 consists in determining whether or not the current Run is the last one for the current Coding Unit (similarly to step 1708).

If the current Run is the last one, an idea of the present embodiment is to avoid signalling the value of the Run length (which often is high, and thus could lead to a quite long codeword), by coding, at step 1805, a flag "1" in the bitstream to indicate that the last Run is being processed.

If the response is negative at step 1804, the next step is step 1806 where a flag "0" is coded in the bitstream saying that the current Run is not the last one. Next, the value of the Run is coded at step 1807, similarly to step 1604.

FIGS. 17 and 18 illustrate the process from the encoder's perspective. One skilled in the art would directly infer the corresponding decoding process at the decoder. This implies parsing the bits from the bitstream to obtain a codeword for the Run element, either a predefined codeword associated with a defined number of indexes or the "up-to-end" codeword according to the invention. For instance, when the "up-to-end" codeword is detected at step 1014 of the decoding process, the Run value to be taken into account may be Pixels_in_Block-j so to drive the process to step 1017 ending it.

The examples of these two Figures keep priority to first (and most frequent) possible values for the Run element (i.e. 0, 1 and 2 for FIG. 17, and 0 for FIG. 18). This implies providing the up-to-end codeword to signal the last Run after steps 1707 and 1803 respectively.

Other variants may provide step 1708 between steps 1703 and 1705 (in which case the up-to-end codeword is "110" for instance), or between steps 1701 and 1703 (in which case the up-to-end codeword is "10" for instance), or even before step 1701 (in which case the up-to-end codeword is "0" for instance). Similarly, another variant for FIG. 18 may provide step 1804 before step 1801 (in which case the up-to-end codeword is "0" for instance). In these variants, the up-to-end codeword to be used for the Run element to signal the last Run is a short codeword.

The cases where steps 1708 and 1804 are before steps 1701 and 1801 respectively may be considered as embodiments where the "up-to-end" flag is separate from the Run element and placed just before the Run element.

Other inventive improvements of the HEVC SCC are not described that are not dependent on the above idea of using the "up-to-end" flag to signal the last Run, but may be combined therewith to improve the efficiency of the coding using the Palette mode.

It has been seen above that in case some pixels cannot be properly represented by any palette entry, they are coded differently, namely "escape-coded", and a specific signalling is provided to distinguish the palette coded pixels from the escaped pixels in the current Coding Unit.

The escape coding mode is quite costly because it requires coding the explicit pixel value, thus requiring a lot of bits to be used. This may be detrimental to coding efficiency.

In addition, referring back to FIG. 13, the evaluation of the palette mode by the encoder requires an index (level) to be found in the palette for each pixel of the Coding Unit. This is step 1308. The processing costs of this step may prove to be high.

To limit such drawbacks, first inventive improvement is proposed to abort the evaluation of the palette mode when the number of escaped pixels reaches a predefined threshold. The processing costs for such evaluation are thus drastically reduced as soon as the compression rate is become low (because each escaped pixel requires a lot of bits in the bitstream). Indeed, if a large number of escaped pixels is needed for coding the current Coding Unit with the palette mode, there is a high probability that a concurrent coding mode (Intra or Inter) for the Coding Unit will have a better rate distortion compromise and will be then selected by the encoder.

Thus a process according to the first inventive improvement includes:

evaluating the coding of the current block of pixels for each of two or more coding modes including a palette coding mode, the palette coding mode using a current palette to build a block of indexes, the current palette comprising a set of entries associating respective entry indexes with corresponding pixel values:

selecting a coding mode from the two or more coding modes to code the current block of pixels, based on the evaluations;

wherein evaluating the coding of the current block of pixels using the palette coding mode comprises: successively considering the pixels of the current block and for each considered pixel:

searching in the palette for a palette entry having a corresponding pixel value close enough to the considered pixel, given a distance threshold;

encoding the considered pixel using an entry index if a palette entry is found in the palette that is close enough to the considered pixel, given the distance threshold; and escape coding the considered pixel if no palette entry is found in the palette that is close enough to the considered pixel, given the distance threshold, the escape coding including the explicit coding of the value of the considered pixel (i.e. without prediction for this pixel);

wherein the evaluating of the coding of the current block of pixels using the palette coding mode is aborted if the number of escape-coded pixels exceeds a predefined threshold for the current block of pixels.

Second inventive improvement is proposed to speed up the palette evaluation, by storing the last pixel processed and corresponding palette level, so to favour reuse of such stored information at low cost due to the redundancy between successive pixels. An exhaustive search of an index for each pixel may thus be avoided.

Thus a process according to the second inventive improvement includes:

building a block of indexes from the current block of pixels and a current palette, the current palette comprising a set of entries associating respective entry indexes with corresponding pixel values:

encoding the block of indexes;

wherein building a block of indexes for the current block of pixels comprises, for each pixel of the current block of pixels, searching in the palette for a palette entry having a corresponding pixel value close enough to the considered pixel, given a distance threshold; adding the entry index of a found palette entry to the block of indexes; and storing the current pixel and the entry index of the found palette entry in memory;

wherein if a value of the current pixel equals a value of a preceding pixel in the current block of pixels, retrieving the entry index stored in memory for the preceding pixel and adding the retrieved index to the block of indexes as the entry index for the current pixel.

The first and second inventive improvements may be combined or used separately when using the palette coding mode.

Figure 19:
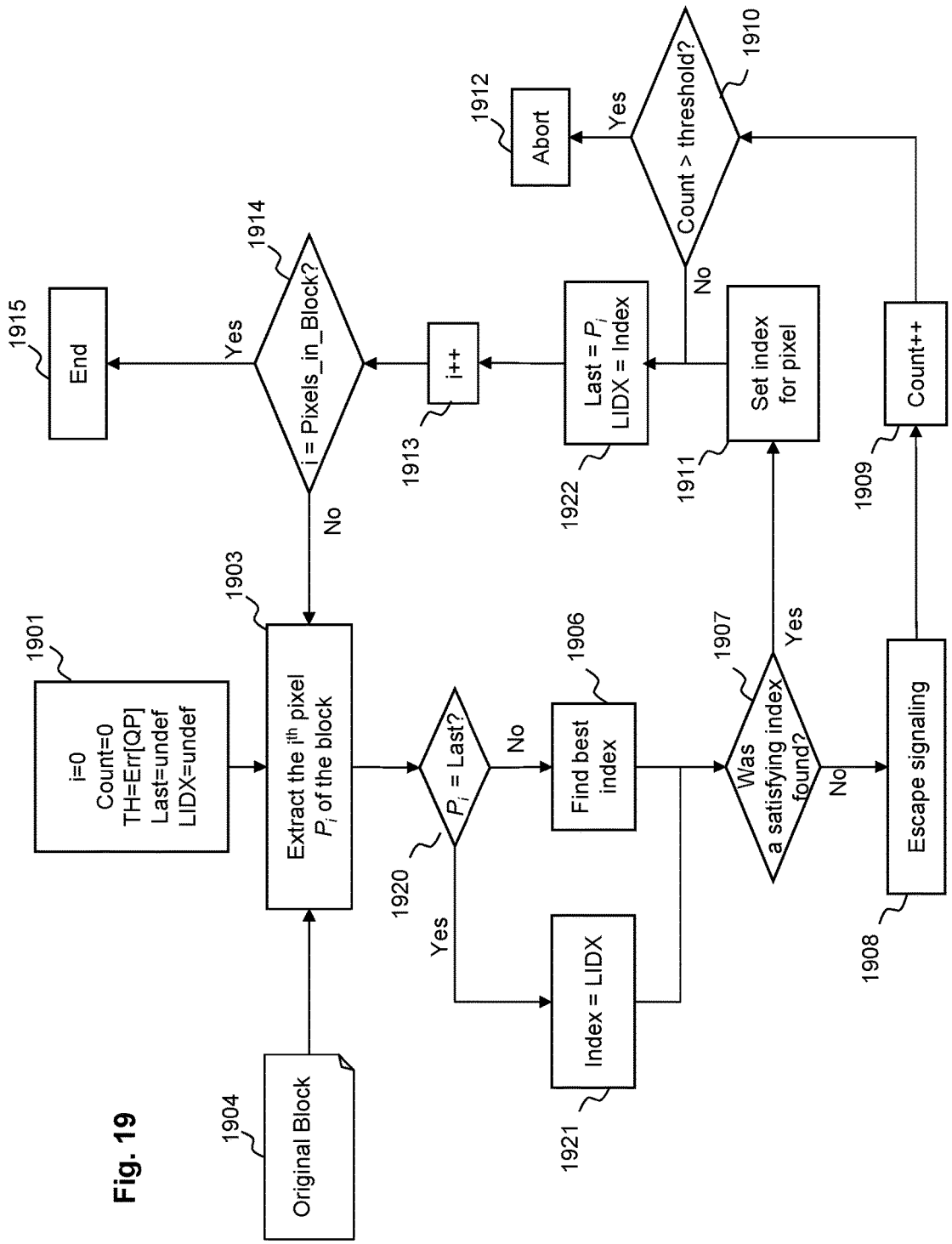
FIG. 19 illustrates an improved algorithm to convert a coding unit into a block of levels using a palette coding mode, including signalling escape-coded pixels.

FIG. 19 illustrates a combination of the two inventive improvements for the palette coding mode. The encoder, knowing the current palette, determines the levels (or indexes) corresponding to the pixels. This is for instance step 1308 described above.

Steps 1909, 1910 and 1914 implement the first inventive improvement consisting in aborting the evaluation of the palette coding mode in case too many pixels are escape coded, in order not to waste processing time. Only a limited number of escaped pixels is thus accepted for the palette coding mode.

Steps 1920, 1921 and 1922 implement the second inventive improvement consisting in keeping track of at least the last index found. In the example of the Figure, only the last index found is kept in memory, but the same could be applied for the last but one index found, and so on.

At starting step 1901, a variable "i" representing a pixel counter to successively consider each pixel in the current Coding Unit is initialized to 0, as well as a variable "Count" used to count the number of escaped pixels in the current Coding Unit. In addition, a variable "TH" defining a count threshold is set to a value, ideally dependent on the quantization parameter QP used at step 108 (FIG. 1). Last but not least, a pixel value variable "Last" and an index variable "LIDX" are set to an "undefined" value in memory.

Next at step 1903, current pixel Pi is read from the original Coding Unit 1904. The current pixel Pi is compared to the current value of Last at step 1920 to know if the current pixel value equals the last pixel processed.

If they are identical, the index for the current pixel is set to LIDX at step 1921, meaning that the current pixel has the same index as the last pixel processed.

Otherwise, the best index is searched for in the palette at step 1906, using a conventional search algorithm. For instance, the search can be based on finding the indexes yielding the least error compared to Pi, based on e.g. maximal component absolute error, sum of absolute errors, sum of squared errors, etc.

Next, step 1907 checks whether the palette entry corresponding to the found index (obtained either by the search algorithm or using LIDX) is sufficiently representative of Pi.

This check may be based on threshold TH defined above: the above mentioned error (computed during the search 1906) can be compared to TH (meaning that if LIDX is used, check 1907 will always be positive). If the error is lower than TH, the palette entry index is found to be representative.

If the palette entry corresponding to the found index is sufficiently representative of Pi, the found index can be used at step 1911 for Pi, i.e. added to the block of levels. Then the process continues with step 1922.

Otherwise, the current pixel Pi is escape coded at step 1908, as explained above. It means that pixel Pi is signalled as "escaped" and its value is explicitly encoded. Next, the escape count Count is incremented at step 1909.

Following step 1909, the encoder checks whether or not the escape count Count has reached a too high value. To do so, at step 1910, it compares Count to a threshold, advantageously dependent of the number of pixels in the current Coding Unit.

In embodiment, the threshold value represents a percentage of the number of pixels in the current Coding Unit, for instance 10%, 20%, 25% or 30%.

If it is found to be too high, the palette evaluation is aborted at step 1912: any further palette processing (palettization, run determination, coding rate evaluation, and so on) is skipped.

If it is not found to be too high, the process continues with step 1922.

In order to accelerate index search, next step 1922 consists in storing in memory the current pixel value Pi and corresponding found index, respectively in Last and LIDX.

Next, at step 1913, variable i is incremented to consider the next pixel "i" of the current Coding Unit.

Next, a check is performed at step 1914 to know whether or not all the pixels of the current Coding Unit have been processed. If they have been, the whole Coding Unit has been "palettized" and the process ends at step 1915. Otherwise, the next pixel is considered at step 1903, already described.

In a variant of the embodiment of FIG. 19, the pixel that is positioned above the current pixel in the current block of pixels may be used for steps 1920 and 1922 instead of the "Last" pixel as defined above. To do so, the associations between pixels and indexes may be stored in memory for a whole row of the Coding Unit (i.e. filled up during step 1922). Then step 1920 may retrieve the association corresponding to the pixel above the current pixel, if it exists.

Figure 20:
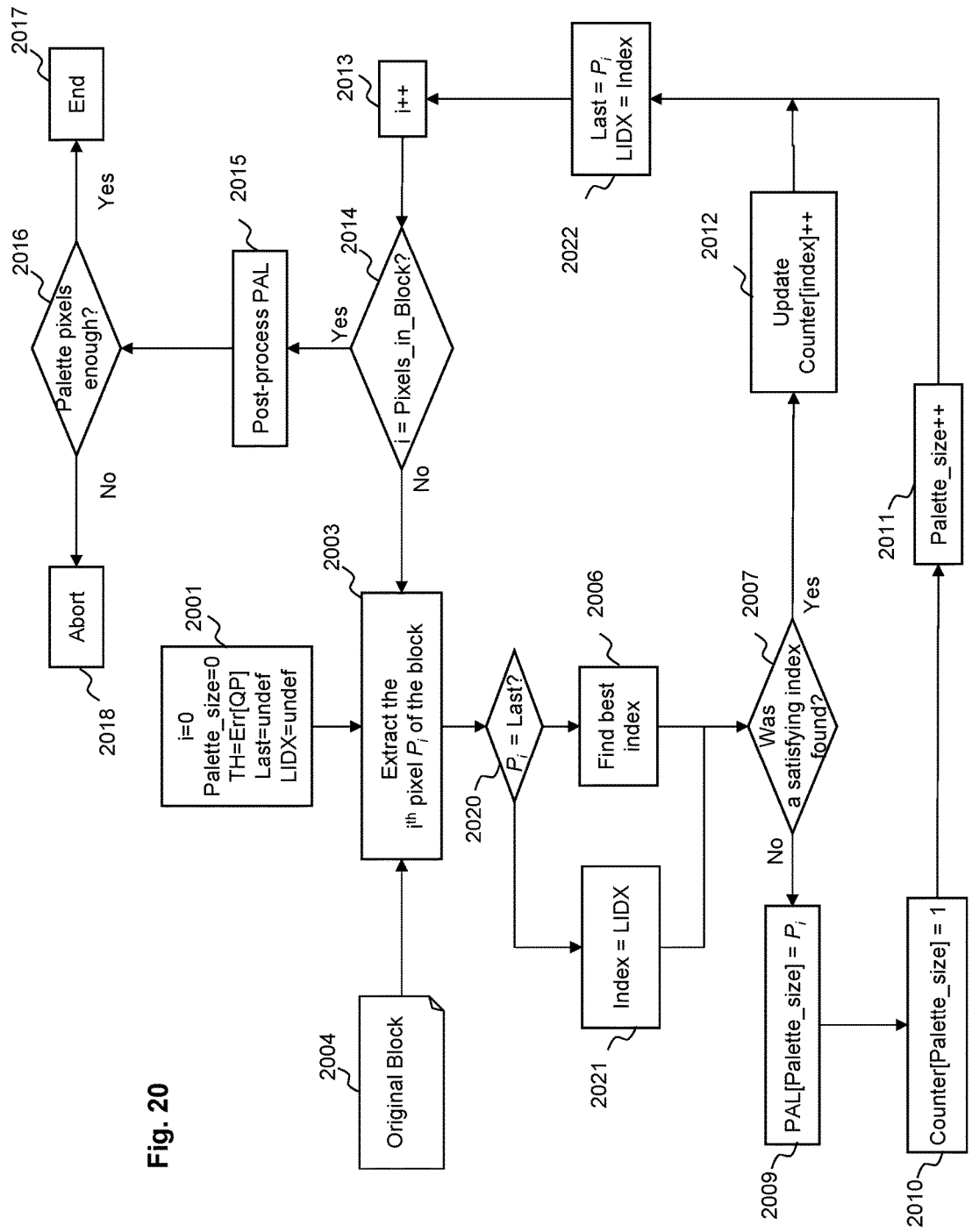
FIG. 20 illustrates an improved algorithm to build a palette for a palette coding mode.

FIG. 20 illustrates another combination of the two inventive improvements for the palette coding mode, occurring during a palette determination algorithm.

The inputs for the encoder are the current Coding Unit and its size. In the example of the Figure, a YUV palette is created. Of course, one skilled in the art could easily adapt this example to the building of a RGB palette.

The algorithm is very similar to the one of FIG. 19. Steps 2003, 2004, 2006, 2007, 2013, 2014, 2020, 2021 and 2022 are similar to steps 1903, 1904, 1906, 1907, 1913, 1914, 1920, 1921 and 1922 respectively. Step 2001 is similar to step 1901 except that a variable "Palette_size" is initialized to 0 while variable Count no longer exists.

Steps 2016 and 2018 implement the first inventive improvement. Steps 2020, 2021 and 2022 implement the second inventive improvement.

To accelerate index search as done in FIG. 19, the current pixel is compared to the current value of Last at step 2020. If they are identical, the index for the current pixel is set to LIDX at step 2021. Otherwise, the best index is searched for in the palette at step 2006.

The process of FIG. 20 differs from the one of FIG. 19 after step 2007 where the encoder checks whether the palette entry corresponding to the found index is sufficiently representative of Pi.

Since the palette is being determined (the process of FIG. 20 belongs to a palette determination algorithm), if the check of step 2007 is negative, current pixel Pi is added to the palette as a new palette entry at step 2009.

In other words, if no palette entry is found in the palette that is close enough to pixel Pi, given a distance threshold, the considered pixel Pi is added as a new palette entry in the palette and adding the corresponding entry index to the block of indexes for the considered pixel. It means that a new palette element is set equal to the pixel value Pi, and current pixel Pi becomes an entry of the palette. More precisely the following assignment is performed:

PALY[j]=(Yi);PALU[j]=(Ui);PALV[j]=(Vi), where Yi,Ui,Vi represents the YUV color component of Pi.

Next, the number of occurrences of this new palette entry is set equal to 1 at step 2010: Counter[Palette_size]=1. Next, variable Palette_size is incremented by one at step 2011, before continuing with step 2022.

If the index is representative of the pixel (check 2007 positive), any information needed for determining the palette is updated at step 2002. In particular, the counter for the entry corresponding to the index (Counter[index]) is incremented. The process continues with step 2022.

At step 2022, the association between the pixel value and the found index is stored in memory by updating variables Last and LIDX.

Next, variable i is incremented at step 2013 to consider the next pixel "i" of the current Coding Unit. A check is performed at step 2014 to know whether or not all the pixels of the current Coding Unit have been processed.

If they have not been, the process continues with step 2003, already described.

If they have been, the process continues with step 2015 of post-processing the built palette. At this time of the process, the table "Counter" contains the occurrences of each palette element.

The post-processing may take into account their occurrences and statistics.

An example of post-processing is described above with reference to step 1215: for instance, the palette elements are ordered according to their occurrences (Counter[ ]) so that the most frequent element is in the first position (entry with the lowest index or "level") in the palette.

Next, the N first palette elements may be kept, and the other palette elements may be deleted. For instance, if the size of the palette is limited to a maximum size, for example 24 entries, a built palette having more than 24 entries is reduced by removing the elements (entries) from the 25$^{th}$ position in the ordered palette.

Next to step 2015, step 2016 consists in determining an estimate of the number of pixels of the current Coding Unit that will be coded using the palette or an estimate of the number of pixels that will be explicitly coded (escape-coded pixels) in the bitstream because their corresponding palette entries have been removed at step 2015. These estimates can be easily obtained by summing the occurrence values (in Counter[ ]) for the corresponding (kept or removed) palette entries.

Step 2016 also consists in comparing the obtained estimate for the escape pixels to a predefined threshold (for instance a percentage of the number of pixels in the Coding Unit). In case the obtained estimate exceeds the threshold, too many escape-coded pixels are envisioned, and the palette mode evaluation is aborted at step 2018. Otherwise, the palette mode evaluation ends correctly at step 2017.

Yet another inventive improvement of the HEVC SCC may also save processing time by again aborting an evaluation process if not relevant. This other inventive improvement may be implemented independently from or in combination with one or more inventive improvements described above.

This improvement takes place in a context where the encoding of the current palette involves predicting such palette using a palette predictor. Thus, it relates to a method for processing a current block of pixels of an image using a palette coding mode, the palette coding mode using a current palette that comprises a set of entries associating respective entry indexes with corresponding pixel values, the method comprising a step of predicting the current palette from at least one palette predictor. For instance, the palette predictor may be one palette previously used to process blocks of pixels in the image, an example of which is described in co-pending application GB 1403823.6.

Usually, two or more palette prediction modes for predicting the current palette are evaluated to determine the best one.

A palette prediction mode consists for the current palette to be predicted from the previously used palette (i.e. for the last Coding Unit encoded with the palette coding mode). Each palette element/entry that is reused from the previously used palette is signaled, by the encoder in the bitstream, through a set of flags indicating which entries are reused. This palette prediction mode is evaluated at the encoder side and is called normal palette evaluation.

Another palette prediction mode consists to fully use a preceding palette of a preceding block of pixels in the image as the current palette to code the current block of pixels. In other words, the palette actually reuses all the entries of the previously used palette. In that case, a flag may be used at the Coding Unit level to indicate that the Coding Unit reuses the entire previously used palette, in which case no explicit palette elements are transmitted: the palette is simply the one of the previously palette-coded CU. This palette prediction mode is also evaluated at the encoder side and is called palette sharing evaluation.

Running the two or more palette prediction modes successively at the encoder side can lead to a very costly evaluation. It is mostly desirable to detect cases where the palette sharing evaluation is ineffective, and skip it as early as possible.

Figure 21:
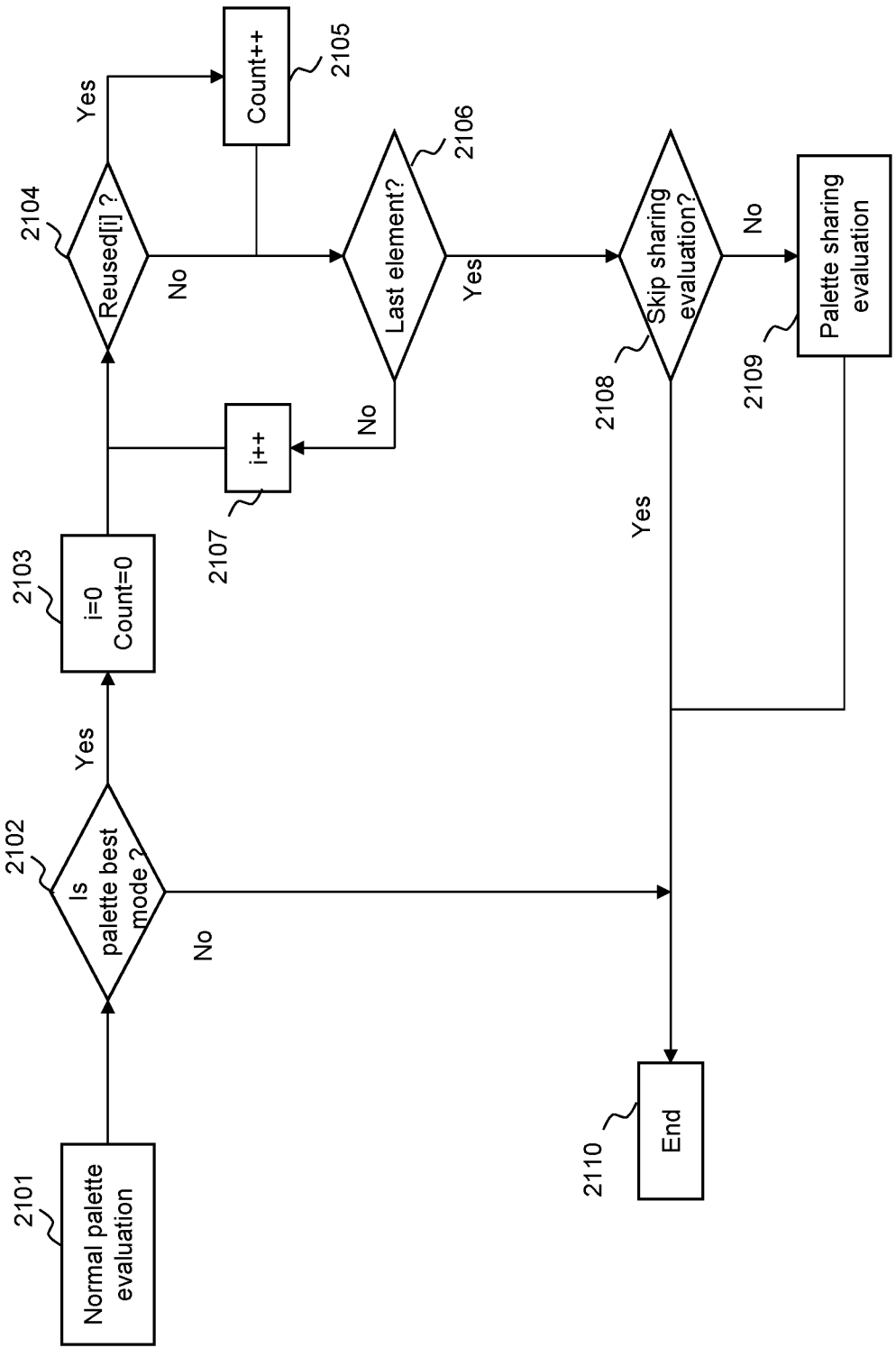
FIG. 21 illustrates an improved algorithm to evaluate palette coding modes.

This is the aim of this third inventive improvement, an example of which is illustrated through FIG. 21, with inventive steps 1802 to 1808. According to this improvement, before performing the palette sharing evaluation, an amount of palette entries of the preceding palette that are reused in the current palette is determined. Based on this determination, the palette sharing evaluation may be skipped, i.e. the evaluating of the coding of the current block of pixels using the first palette prediction mode is skipped if it is determined that the amount of reused palette entries is below a predefined threshold.

An input of the process of FIG. 21 is the current palette that is fully known. It may be the current palette once the normal palette evaluation 2101 ends.

Once the normal palette evaluation has been performed (2101), its palette elements are known. Whether the palette coding mode is the best coding mode for the current Coding Unit is checked at step 2102.

If it is not, it is unlikely that using palette sharing will improve things. Consequently, the palette evaluation process ends at step 2110.

If it is, the number of elements from the previous palette reused in the current palette is counted through looping steps 2103 to 2106.

The counting loop is initialized by setting a variable "i" representing the current entry index and a variable "Count" representing the number of reused palette elements both to 0 at step 2103. Next, step 2104 consists to check whether or not the $i^{th}$ palette element from the previous palette is reused. If it is, the number of reused elements is incremented at step 2105 and the process goes to step 2106. Otherwise, the process goes directly to step 2106.

Step 2106 consists to check whether or not the $i^{th}$ palette element is the last element of the previous palette. If it is not, the next palette element is selected by incrementing "i" at step 2107 before looping back to step 2104.

If it is the last palette element of the previous palette, step 2108 consists to evaluate whether or not the palette sharing evaluation can be skipped.

A simple check may consist in comparing Count to the current palette size to ensure a minimum ratio of the current palette elements be reused before authorizing the palette sharing evaluation.

If the minimum ratio is not reached (too few elements are reused), the palette evaluation ends at step 2110 without performing the palette sharing evaluation. The latter is thus skipped.

Otherwise (the minimum ratio is reached), the palette sharing evaluation is performed at step 2109 in a conventional manner, before ending the process at step 2110.

Figure 14:
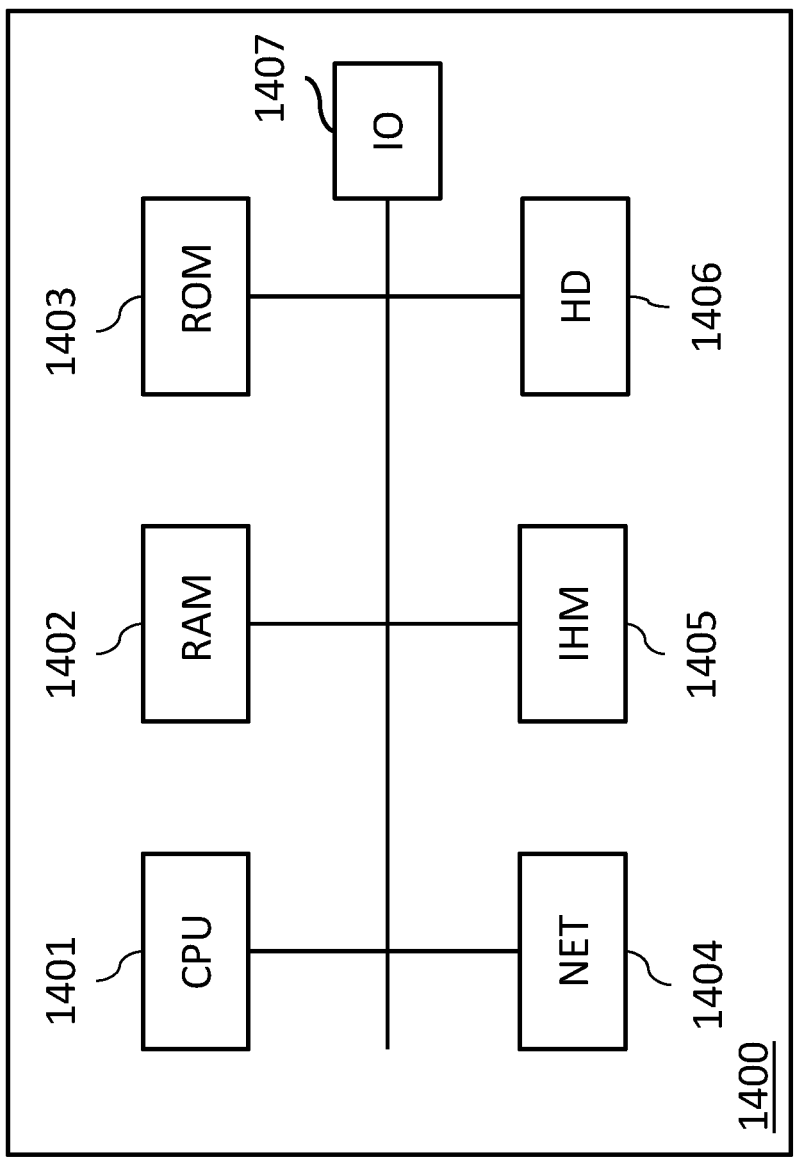
FIG. 14 is a schematic block diagram of a computing device for implementation of one or more embodiments of the invention.

FIG. 14 is a schematic block diagram of a computing device 1400 for implementation of one or more embodiments of the invention. The computing device 1400 may be a device such as a micro-computer, a workstation or a light portable device. The computing device 1400 comprises a communication bus connected to:
- a central processing unit 1401, such as a microprocessor, denoted CPU;
- a random access memory 1402, denoted RAM, for storing the executable code of the method of embodiments of the invention as well as the registers adapted to record variables and parameters necessary for implementing the method according to embodiments of the invention, the memory capacity thereof can be expanded by an optional RAM connected to an expansion port for example;
- a read only memory 1403, denoted ROM, for storing computer programs for implementing embodiments of the invention;
- a network interface 1404 is typically connected to a communication network over which digital data to be processed are transmitted or received. The network interface 1404 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 1401;
- a user interface 1405 may be used for receiving inputs from a user or to display information to a user;
- a hard disk 1406 denoted HD may be provided as a mass storage device;
- an I/O module 1407 may be used for receiving/sending data from/to external devices such as a video source or display.

The executable code may be stored either in read only memory 1403, on the hard disk 1406 or on a removable digital medium such as for example a disk. According to a variant, the executable code of the programs can be received by means of a communication network, via the network interface 1404, in order to be stored in one of the storage means of the communication device 1400, such as the hard disk 1406, before being executed.

The central processing unit 1401 is adapted to control and direct the execution of the instructions or portions of software code of the program or programs according to embodiments of the invention, which instructions are stored in one of the aforementioned storage means. After powering on, the CPU 1401 is capable of executing instructions from main RAM memory 1402 relating to a software application after those instructions have been loaded from the program ROM 1403 or the hard-disc (HD) 1406 for example. Such a software application, when executed by the CPU 1401, causes the steps of the flowcharts shown in FIGS. 17 to 21 to be performed.

Any step of the algorithms shown in FIGS. 17 to 21 may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of decoding a current block of pixels in an image from a bitstream, the method comprising:
obtaining indexes of a block, escaped pixel values, and a palette, the palette comprising a set of entries associating respective entry indexes with corresponding pixel values, and the escaped pixel values comprising pixel values for pixels having no corresponding index in the block that is associated with a pixel value in the palette; and
forming the current block of pixels from the indexes of the block, the escaped pixel values and the palette;
wherein obtaining the indexes of the block comprises:
obtaining, from the bitstream, syntax elements for generating the indexes of the block, wherein the syntax elements include a syntax element of a run which specifies the number of successive positions in the block at which to apply one of a plurality of processes for determining index values; and generating the indexes of the block in a given scan order, based on the syntax elements, wherein the syntax elements further include a flag indicating a final run that is to use one of said plurality of processes for determining index values for all remaining positions in the block up to the end of the block, regardless of the number of remaining positions in the block.

2. The method of claim 1, wherein said syntax elements use a predefined codeword associated with a defined number of indexes, and corresponding to a group of indexes of the block of indexes, and the syntax element, corresponding to last positions in the block of indexes uses the flag.

3. A method of encoding a current block of pixels in an image, the method comprising:

generating indexes of a block and escaped pixel values from the current block of pixels and a palette, the palette comprising a set of entries associating respective entry indexes with corresponding pixel values, and the escaped pixel values comprising pixel values for pixels having no corresponding index in the block that is associated with a pixel value in the palette; and encoding the indexes of the block and the escaped pixel values;

wherein encoding the indexes of the block comprises:

generating syntax elements for generating the indexes of the block, wherein the syntax elements include a syntax element of a run which specifies the number of successive positions in the block at which to apply one of a plurality of processes for determining index values, wherein the syntax elements further include a flag indicating a final run that is to use one of said plurality of processes for determining index values for all remaining positions in the block up to the end of the block, regardless of the number of remaining positions in the block.

4. The method of claim 3, wherein said syntax elements use a predefined codeword associated with a defined number of indexes, and corresponding to a group of indexes of the block of indexes, and the syntax element, corresponding to last positions in the block of indexes uses the flag.

5. A non-transitory computer-readable medium storing a program which, when executed by a microprocessor or computer system in a device, causes the device to perform a method of decoding a current block of pixels in an image from a bitstream, the method comprising:

obtaining indexes of a block, escaped pixel values and a palette, the palette comprising a set of entries associating respective entry indexes with corresponding pixel values, and the escaped pixel values comprising pixel values for pixels having no corresponding index in the block that is associated with a pixel value in the palette; and forming the current block of pixels from the indexes of the block, the escaped pixel values and the palette;

wherein obtaining the indexes of the block comprises obtaining, from the bitstream, syntax elements for generating the indexes of the block, wherein the syntax elements include a syntax element of a run which specifies the number of successive positions in the block at which to apply one of a plurality of processes for determining index values; and generating the indexes of the block in a give scan order, based on the syntax elements, wherein the syntax elements further include a flag indicating a final run that is to use one of said plurality of processes for determining index values for all remaining positions in the block up to the end of the block, regardless of the number of remaining positions in the block.

6. A non-transitory computer-readable medium storing a program which, when executed by a microprocessor or computer system in a device, causes the device to perform a method of encoding a current block of pixels in an image, the method comprising:

generating indexes of a block and escaped pixel values from the current block of pixels and a palette, the palette comprising a set of entries associating respective entry indexes with corresponding pixel values, and the escaped pixel values comprising pixel values for pixels having no corresponding index in the block that is associated with a pixel value in the palette; and encoding the indexes of the block and the escaped pixel values;

wherein encoding the indexes of the block comprises:

generating syntax elements for generating the indexes of the block, wherein the syntax elements include a syntax element of a run which specifies the number of successive positions in the block at which to apply one of a plurality of processes for determining index values, wherein the syntax elements further include a flag indicating a final run that is to use one of said plurality of processes for determining index values for all remaining positions in the block up to the end of the block, regardless of the number of remaining positions in the block.

7. A decoding device for decoding a current block of pixels in an image from a bitstream, the decoding device comprising:

an obtaining unit configured to obtain indexes of a block, escaped pixel values and a palette, the palette comprising a set of entries associating respective entry indexes with corresponding pixel values, and the escaped pixel values comprising pixel values for pixels having no corresponding index in the block that is associated with a pixel value in the palette; and a decoding unit configured to form the current block of pixels from the indexes of the block, the escaped pixel values and the palette;

wherein obtaining the indexes of the block comprises;

obtaining, from the bitstream, syntax elements for generating the indexes of the block, wherein the syntax elements include a syntax element of a run which specifies the number of successive positions in the block at which to apply one of a plurality of processes for determining index values; and generating the indexes of the block in a given scan order, based on the syntax elements, wherein the syntax elements further include a flag indicating a final run that is to use one of a plurality of processes for determining index values for all remaining positions in the block up to the end of the block, regardless of the number of remaining positions in the block.

8. An encoding device for encoding a current block of pixels in an image, the encoding device comprising:

a generating unit configured to generate indexes of a block, escaped pixel values from the current block of pixels and a palette, the palette comprising a set of entries associating respective entry indexes with corresponding pixel values, and the escaped pixel values comprising pixel values for pixels having no corresponding index in the block that is associated with a pixel value in the palette; and an encoding unit configured to encode the indexes of the block and the escaped pixel values;

wherein encoding the indexes of the block comprises:

generating syntax elements for generating the indexes of the block, wherein the syntax elements include a syntax element of a run which specifies the number of successive positions in the block at which to apply one of a plurality of processes for determining index values, wherein the syntax elements further include a flag indicating a final run that is to use one of said plurality of processes for determining index values for all remaining positions in the block up to the end of the block, regardless of the number of remaining positions in the block.

* * * * *